United States Patent
Zhang

(10) Patent No.: US 11,562,500 B2
(45) Date of Patent: Jan. 24, 2023

(54) STATUS MONITORING USING MACHINE LEARNING AND MACHINE VISION

(71) Applicant: Squadle, Inc., Cambridge, MA (US)

(72) Inventor: Le Zhang, Allston, MA (US)

(73) Assignee: Squadle, Inc., Cambridge, MA (US)

( * ) Notice: Subject to any disclaimer, the term of this patent is extended or adjusted under 35 U.S.C. 154(b) by 62 days.

(21) Appl. No.: 16/938,626

(22) Filed: Jul. 24, 2020

(65) Prior Publication Data

US 2021/0027485 A1 Jan. 28, 2021

Related U.S. Application Data

(60) Provisional application No. 62/878,176, filed on Jul. 24, 2019.

(51) Int. Cl.
*G06K 9/62* (2022.01)
*G06T 7/73* (2017.01)
*G06T 7/11* (2017.01)
*G10L 15/16* (2006.01)
*G06Q 50/12* (2012.01)
*G06T 5/50* (2006.01)

(52) U.S. Cl.
CPC ............... *G06T 7/73* (2017.01); *G06Q 50/12* (2013.01); *G06T 5/50* (2013.01); *G06T 7/11* (2017.01); *G10L 15/16* (2013.01); *G06T 2207/20084* (2013.01)

(58) Field of Classification Search
CPC ..... G06T 7/73; G06T 5/50; G06T 7/11; G06T 2207/20084; G06Q 50/12; G10L 15/16; G10L 25/57; G06K 9/6271; G06V 10/25; G06V 10/82; G06V 20/52

USPC ......... 382/156, 165, 199; 348/143, 164, 148
See application file for complete search history.

(56) References Cited

U.S. PATENT DOCUMENTS

| | | | |
|---|---|---|---|
| 5,604,823 A | * | 2/1997 | Ono ..................... G06V 30/194 382/199 |
| 9,171,278 B1 | | 10/2015 | Kong et al. |
| 9,534,938 B1 | | 1/2017 | Zhang et al. |
| 9,921,112 B2 | | 3/2018 | Zhang et al. |
| 9,934,657 B2 | | 4/2018 | Tkachenko et al. |
| 10,127,438 B1 | | 11/2018 | Fisher et al. |
| 10,127,607 B2 | * | 11/2018 | Gupta ............ G06Q 10/063114 |
| 10,133,933 B1 | | 11/2018 | Fisher et al. |

(Continued)

OTHER PUBLICATIONS

Girshick, "Fast R-CNN," Proceedings of the IEEE International Conference on Computer Vision (ICCV), Dec. 2015, pp. 1440-1448.

(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on computer-storage media, for status monitoring using machine vision and machine learning. In some implementations, image data representing a monitored area is obtained. Input data based on the image data is provided to one or more machine learning models trained to detect different properties of the monitored area. Output of the one or more machine learning models is received. The output of the one or more machine learning models is evaluated to detect a condition present in the monitored area. Output is provided indicating the detected condition present in the monitored area.

20 Claims, 7 Drawing Sheets

(56) References Cited

U.S. PATENT DOCUMENTS

| | | | |
|---|---|---|---|
| 10,373,116 B2 | 8/2019 | Medina et al. | |
| 10,510,219 B1 | 12/2019 | Zalewski et al. | |
| 10,643,059 B2 | 5/2020 | Adato et al. | |
| 10,703,521 B2 | 7/2020 | Almogy et al. | |
| 10,706,386 B2 | 7/2020 | Trivelpiece et al. | |
| 10,757,861 B2 | 9/2020 | Robertson et al. | |
| 10,769,582 B2 | 9/2020 | Williams et al. | |
| 10,859,443 B1 | 12/2020 | Zhang et al. | |
| 10,861,086 B2 | 12/2020 | Glaser et al. | |
| 11,023,850 B2 | 6/2021 | Fisher et al. | |
| 11,049,120 B2 | 6/2021 | Garel et al. | |
| 11,062,547 B2 | 7/2021 | Adelberg et al. | |
| 11,093,896 B2 | 8/2021 | Perrella et al. | |
| 11,232,687 B2 | 1/2022 | Fisher et al. | |
| 11,250,376 B2 | 2/2022 | Fisher et al. | |
| 2013/0278771 A1* | 10/2013 | Magoun | H04N 5/33 348/148 |
| 2014/0168433 A1* | 6/2014 | Frank | B60Q 1/00 348/143 |
| 2015/0086179 A1 | 3/2015 | Hurst et al. | |
| 2016/0019471 A1 | 1/2016 | Shin et al. | |
| 2016/0232624 A1 | 8/2016 | Goldberg et al. | |
| 2019/0149725 A1 | 5/2019 | Adato et al. | |
| 2019/0180150 A1 | 6/2019 | Taylor et al. | |
| 2019/0236530 A1 | 8/2019 | Cantrell et al. | |
| 2019/0333039 A1 | 10/2019 | Glaser et al. | |
| 2020/0074402 A1 | 3/2020 | Adato et al. | |
| 2020/0079412 A1 | 3/2020 | Ramanathan et al. | |
| 2021/0174155 A1 | 6/2021 | Smith et al. | |

OTHER PUBLICATIONS

Ren et al., "Faster R-CNN: Towards Real-Time Object Detection with Region Proposal Networks," IEEE Transactions on Pattern Analysis and Machine Intelligence, Jun. 2017, 14 pages.

squadle.com [online], "Squadle Checklists Features," Jul. 23, 2019, retrieved on Jul. 23, 2019, retrieved from URL<www.squadle.com/features>, 4 pages.

squadle.com [online], "Squadle raises $3M to fuel nationwide expansion with franchises of McDonald's and Dunkin' Brands," Jul. 25, 2018, retrieved on Jul. 31, 2018, retrieved from URL<https://squadle.com/news/squadle-raises-3m-to-fuel-nationwide-expansion-with-franchisees-of-mcdonalds-and-dunkin-brands/>, 19 pages.

squadle.com [online], "Squadle," 2017, retrieved on Jun. 16, 2018, retrieved from URL<www.squadle.com>, 5 pages.

\* cited by examiner

STATUS MONITORING USING MACHINE LEARNING AND MACHINE VISION

CROSS-REFERENCE TO RELATED APPLICATION

This application claims the benefit of U.S. Provisional Patent Application Ser. No. 62/878,176, filed on Jul. 24, 2019, the entire contents of which are incorporated by reference herein.

BACKGROUND

Conditions can vary widely and change quickly at restaurants, retail stores, and other areas open to the public. Identifying and resolving unfavorable conditions can be important to create a consistent and enjoyable environment at a location.

SUMMARY

In some implementations, a system uses machine learning models to analyze image data and automatically detect a variety of conditions. For example, cameras and other sensors can be placed in restaurants, bakeries, convenience stores, retail stores, and other locations. Image data from the sensors can be provided to machine learning models that are trained to detect objects and determine the status of the objects. For example, the system can detect the presence of a table or chair in an image, and classify it as being occupied or available. As another example, the system can detect a shelf or display area shown in an image, determine which product corresponds to the detected area, and classify whether the area needs to be restocked. As another example, the system can detect areas such as floors and counters and classify portions of the areas as being clean or dirty. As another example, the system can detect people shown in images and classify their status or activities, for example to determine an amount of people waiting in line or waiting for service.

Based on the predictions and classifications of the machine learning models, the system identifies conditions that need to be addressed and can automatically notify managers or others. Using image feeds from in-store cameras, the system can use machine learning models to assess conditions in real time and detect quality and consistency issues. In some implementations, the system generates tasks that need to be performed and automatically assigns the tasks to appropriate workers. For example, if a table is identified as being dirty, the system can generate a task to clean the table. The system can identify a worker having responsibility for that table and communicate the task to the worker. The system can also track the progress of the task, for example, detecting in subsequently captured images whether the table still needs to be cleaned and detecting when the table has been cleaned. The system can similarly detect issues and initiate corrective action in many other cases. For example, the system can detect that a line of people at checkout exceeds a certain number, and notify workers that an additional register needs to be opened. As another example, the system can monitor stock in display areas (e.g., display cases, shelves, etc.), determine when stock levels are low, and assign tasks to replenish stock of specific items or at specific areas.

The techniques for machine learning and machine vision discussed herein may be implemented in various forms, such as by deploying trained machine learning models locally at locations to be monitored, by analyzing sensor data (e.g., image data, video data, audio data, etc.) using trained machine learning models at a remote server, or a combination of local and remote processing. In some implementations, the machine learning models are made available as a cloud-computing-based service accessible using an application programming interface (API).

In general, the techniques herein enable a computer system to use a camera or other sensor to monitor an area, detect conditions in the monitored area that satisfy criteria, and notify one or more devices or users of the detected conditions. For example, one or more machine learning models can be used to detect an object or region but also to detect the state or condition of the object or region. In addition, the system can evaluate the detected conditions and determine which, if any, satisfy criteria for needing intervention or attention by a user. The system can also automatically determine actions to resolve undesired conditions that are detected, for example, by mapping a condition to a task or other corrective action that a user or system can perform to remove the condition.

Many different businesses, such as restaurants, retailers, hotels, etc., need to maintain consistent operations, including consistency in the appearance and functionality of their physical spaces for their customers. Nevertheless, conditions are often frequently or even constantly changing as people come and go and interact with each other and the location. For example, in a fast food restaurant, people come and go frequently, people sit down at tables then leave, supplies like condiments and paper goods are used and may become depleted, tables may become dirty, spills of food and drink may occur, and so on. These ongoing, rapid changes in retail environments and other settings can make it difficult for workers to provide a consistent, inviting, and fully usable space for visitors.

The present system provides tools that can automatically detect inconsistencies for locations, e.g., deviations from the desired range of conditions that a business desires. With data from cameras and/or other sensors, the system can identify issues in a space that need to be corrected, for example, to maintain consistency of presentation and usability of the space. This can be done using machine learning models to analyze image data and other sensor data to detect and localize events and conditions that may require correction or attention by a worker. This can include localizing specific portions of room or other monitored space where a condition needing attention exists. The system further informs appropriate devices and workers of the conditions it detects (e.g., differences from the set of desirable states) and can maintain a log of identified conditions needing attention. In some implementations, the system selectively notifies individuals by identifying one or more individuals that are responsible for or capable of correcting undesirable detected conditions and notifies these individuals. The system can additionally classify the issues it detects, and can even identify and recommend corresponding corrective actions.

The system can keep track of the state of conditions that it has detected. For example, track the progress of detected issues over time, determining whether problematic conditions remain over time and reminding and escalating notifications to appropriate systems or users to ensure that conditions that need attention are addressed and not forgotten. The system can detect when conditions are changed or when issues are resolved, such as when a dirty table is cleaned, when a low-stocked item is replenished, or more generally when a monitored area returns to one of a set of desirable states or conditions. If the system determines that a condition that deviates from the range of proper operating conditions for the monitored area persists for a certain amount of time, such as 30 minutes after notifying a worker involved, the system can take additional actions, such as sending a reminder, informing a supervisor, assigning an additional worker to address the condition, etc.

In some implementations, different workers are provided different task lists or status views with different sets of conditions and/or needed corrective actions for their role or area of responsibility. For example, three workers may each have different sets of item provided for view through an application on their respective mobile devices, each set corresponding to the workers responsibilities. A view provided on a mobile device of a manager can be provided a view of more comprehensive set of items, such as the combined list of all items for the store or a list of the highest priority items for the store. Similarly, a computer or other device viewable by multiple workers can show a summary of items for the store, for different workers to view.

The system can store records of the conditions detected, the actions taken, and the resulting conditions or state of the monitored area, as well as the timing of each part of the process. This data can be used to provide an audit at a later time. For example, the data can be used to indicate how often different types of conditions occurred, how quickly they were corrected, the types of notifications needed before correction occurred, and so on. The system can store and provide images of the monitored area at different times corresponding to the records, such as images of the area at the time the condition was detected, at one or more subsequent times (such as after notification to address the condition has been issued), and once the condition was determined to be removed or when a worker indicated that the condition was corrected.

In one general aspect, a method performed by one or more computers includes: obtaining, by the one or more computers, image data from a camera, the image data representing an image of a monitored area; providing, by the one or more computers and to one or more machine learning models, input data that is based on the image data representing the image of the monitored area, where the one or more machine learning models have been trained to detect different properties of the monitored area; receiving, by the one or more computers, output of the one or more machine learning models, the output indicating (i) one or more status classifications for the monitored area and a respective location for each of the one or more status classifications, or (ii) whether the image data shows a state that is inconsistent with normal or expected states of the monitored area; evaluating, by the one or more computers, the output of the one or more machine learning models to detect a condition present in the monitored area; and providing, by the one or more computers, output indicating the detected condition present in the monitored area.

In some implementations, the one or more machine learning models have been trained to detect a plurality of different types of objects and to indicate a status of at least one of the types of objects; and the output of the one or more machine learning models indicates (i) locations of identified objects in the image data representing the image of the monitored area, (ii) an object status classification for at least one of the identified objects, and (iii) confidence scores for the identification of the objects and/or the object status classifications.

In some implementations, evaluating the output of the one or more machine learning models includes applying one or more post-processing rules to the output of the one or more machine learning models to filter a list of the identified objects based on the confidence scores. Evaluating the filtered list of identified objects with respect to one or more predetermined criteria to detect a condition present in the monitored area.

In some implementations, evaluating the output of the one or more machine learning models includes detecting, output of the one or more machine learning models, a condition representing a difference from a desirable range or set of conditions for the monitored area.

In some implementations, the method includes storing data indicating a baseline range or set of conditions for the monitored area. Evaluating the output of the one or more machine learning models includes determining, based on the output of the one or more machine learning models, that the image data represents a state of the monitored area that is outside a baseline range or set of conditions for the monitored area. Providing the output indicating the detected condition present in the monitored area is performed in response to determining that the image data represents a state of the monitored area that is outside the baseline range or set of conditions for the monitored area.

In some implementations, the method includes determining that the detected condition is a condition for which intervention by a user is needed. Providing the output indicating the detected condition present in the monitored area is performed in response to determining that the detected condition is a condition for which intervention by a user is needed.

In some implementations, the output identifies the location of the detected condition within the monitored area by providing an identifier for an object or location of the detected condition or indicating a region of the image data where the detected condition occurs.

In some implementations, the method includes generating a record for a task corresponding to the detected condition. Providing the output includes providing, to a device associated with a worker for the monitored area, data indicating the task to be performed.

In some implementations, the method includes accessing mapping data that maps conditions at the monitored area with tasks to perform corrective actions to remove the respective conditions. Generating the record for the task includes: identifying the task that the mapping data associates with the detected condition; and creating a new instance of the identified task.

In some implementations, the method includes accessing data indicating a set of workers associated with the monitored area; identifying, from among the set of workers, a worker having responsibility for the detected condition; and assigning the task to the identified worker. Providing data indicating the task to be performed includes providing an indication of the assigned task to a device associated with the identified worker.

In some implementations, the method includes, after providing the data indicating the task to be performed: obtaining second image data from the camera representing a second image of the monitored area; processing the second image data using the one or more machine learning models to detect conditions present in the monitored area, and based on processing the second image data: determining that the task has been completed based on determining that detected condition is not detected based on the second image data; or determining that the task has not been completed based on determining that the detected condition is detected based on the second image data.

In some implementations, the method includes obtaining audio data recorded by a microphone located in the monitored area; and using the audio data to determine an event or condition at the monitored area.

In some implementations, using the audio data to determine an event or condition at the monitored area includes: determining whether a sound level at the monitored area exceeds a threshold; or determining whether one or more workers spoke a predetermined word or phrase in a conversation with a visitor to the monitored area.

In some implementations, the one or more machine learning models comprise a convolutional neural network.

In some implementations, the one or more machine learning models comprise a neural network including a region proposal network portion configured to identify regions within an image and an object detection network portion configured to classify the regions identified by the region proposal network portion.

In some implementations, the monitored area is a public area of a retail store.

In some implementations, the retail store is a restaurant.

In some implementations, providing output indicating the detected condition present in the monitored area includes providing image data for an image of the monitored area having an annotation indicating a location of the detected condition within the monitored area.

In another general aspect, a method includes: obtaining image data from a camera, the image data representing an image of a monitored area; providing, to one or more machine learning models, input data obtained based on the image data representing the image of the monitored area, wherein the one or more machine learning models have been trained to detect a plurality of different types of objects and indicate a status of at least one of the types of objects; receiving output of the one or more machine learning models, the output indicating (i) locations of identified objects in the image data representing the image of the monitored area, (ii) an object status classification for at least one of the identified objects, and (iii) confidence scores for the identification of the objects and/or the object status classifications; applying one or more post-processing rules to the output of the one or more machine learning models to filter a list of the identified objects based on the confidence scores; evaluating the filtered list of identified objects with respect to one or more predetermined criteria to detect a condition present in the monitored area; and providing output indicating the detected condition present in the monitored area.

In some implementations, the public area is a dining area, a seating area, a waiting area, an ordering or checkout area, or an entryway.

In some implementations, the detected condition comprises detection: that an object is dirty, that litter is present in an area, that a trash bin is overfilled, that a queue or group has greater than a threshold amount of people, that signage or marketing material does not meet predetermined criteria, that one or more people have occupied an area for longer than a threshold amount of time, that a plant or decoration needs adjustment, that a device needs maintenance, that equipment is damaged or missing, that a display case or shelf is stocked with less than a desired amount of a product, or that a display case or shelf is stocked with an incorrect amount or type of product.

In some implementations, providing the output indicating the detected condition comprises providing output that indicates the detected condition and identifies a location of the detected condition within the public area.

In some implementations, the output identifies the location of the detected condition within the public area by providing an identifier for an object or location of the detected condition or indicating a region of the image data where the detected condition occurs.

In some implementations, the method includes, based on evaluating the filtered list of identified objects to detect the condition, generating a record for a task corresponding to the detected condition. Providing the output comprises providing, to a device associated with a worker at the monitored area, data indicating the task to be performed.

In some implementations, the method includes accessing mapping data that maps conditions at the monitored area with tasks to perform corrective actions to remove the respective conditions. Generating the record for the task comprises: identifying the task that the mapping data associates with the detected condition; and creating a new instance of the identified task.

In some implementations, the method includes accessing data indicating a set of workers at the monitored area; identifying, from among the set of workers, a worker having responsibility for the detected condition; and assigning the task to the identified worker. Providing data indicating the task to be performed comprises providing an indication of the assigned task to a device associated with the identified worker.

In some implementations, the method includes, after providing the data indicating the task to be performed: obtaining second image data from the camera representing a second image of the monitored area; processing the second image data using the one or more machine learning models to detect conditions present in the monitored area, and based on processing the second image data: determining that the task has been completed based on determining that detected condition is not detected based on the second image data; or determining that the task has not been completed based on determining that the detected condition is detected based on the second image data.

In some implementations, providing the output comprises providing a real-time notification of the detected condition while the detected condition is present in the monitored area.

In some implementations, providing the output comprises causing one or more devices to provide an audible output, a visual output, a haptic output, a text message, an indication in a graphical user interface, an e-mail message, or an output provided using an application programming interface.

In some implementations, providing the output comprises providing annotation data for the image data, the annotation data indicating regions of the image data corresponding to the objects in the filtered list of objects and a status classification of one or more of the objects in the in the filtered list of objects.

In some implementations, the method comprises periodically repeating the obtaining, the providing input data, the receiving, the applying, the evaluating, and the providing output at a predetermined interval to repeatedly detect conditions at the monitored area over a period of time.

In some implementations, the method includes: providing an interface to receive audit requests for conditions at the monitored area; receiving, through the interface, an audit request corresponding to one or more types of conditions at the monitored area; and providing, in response to the audit request, data indicating a current status of the monitored area with respect to the one or more type of conditions.

In some implementations, the method includes, in response to receiving the audit request, providing measures of the occurrence and removal of the one or more types of conditions at the monitored area over a period of time, the measures being based on records of analysis of multiple sets of image data from the camera.

In some implementations, the method includes obtaining audio data recorded by a microphone located in the monitored area; and using the audio data to determine an event or condition at the monitored area.

In some implementations, using the audio data to determine an event or condition at the monitored area comprises: determining whether a sound level at the monitored area exceeds a threshold; or determining whether one or more workers spoke a predetermined word or phrase in a conversation with a visitor to the monitored area.

In some implementations, applying the post-processing rules removes, from the list of the identified objects, (i) objects associated with confidence scores that are below a threshold and/or (ii) objects that have bounding regions in the image data that overlap by more than a threshold amount with bounding regions in the image data for objects associated with higher confidence scores.

In some implementations, providing output indicating the detected condition present in the monitored area comprises providing an indication of the detected condition or a task to address the detected condition to each of multiple workers of the monitored area.

In some implementations, providing output indicating the detected condition present in the monitored area comprises providing an indication of the detected condition or a task to address the detected condition to each of multiple workers of the monitored area.

In some implementations, the one or more machine learning models comprise a convolutional neural network.

In some implementations, the one or more machine learning models comprise a neural network comprising a region proposal network portion configured to identify regions within an image and an object detection network portion configured to classify the regions identified by the region proposal network portion.

In some implementations, the region proposal network portion and the object detection network portion share at least one convolutional layer.

In some implementations, the method includes updating a training state of the one or more machine learning models based on: the image data from the camera, image data from a different camera located at a different monitored area, the image data from the different image data providing a view of a public area of a same type as the monitored area, and/or user feedback data indicating an action taken by a user after providing output indicating the detected condition.

In some implementations, the method includes: using multiple cameras located at a location to capture image data representing different types of areas of the location, and processing the image data from each of the multiple cameras using a different model corresponding to the camera, each of the different models having a different training state and being trained to detect a set of objects and object status corresponding to the area of the location represented in the image data from the corresponding camera.

In some implementations, the monitored area is a public area of a retail store.

In some implementations, the retail store is a restaurant.

In some implementations, the method includes: obtaining audio data indicating a conversation of a worker in the monitored area; and determining whether the conversation of the worker includes one or more predetermined words or phrases of a script for interacting with customers.

In some implementations, determining whether the conversation of the worker includes one or more predetermined words or phrases of a script for interacting with customers comprises using an automated speech recognizer or an automated keyword spotting system to detect the one or more predetermined words or phrases of the script.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
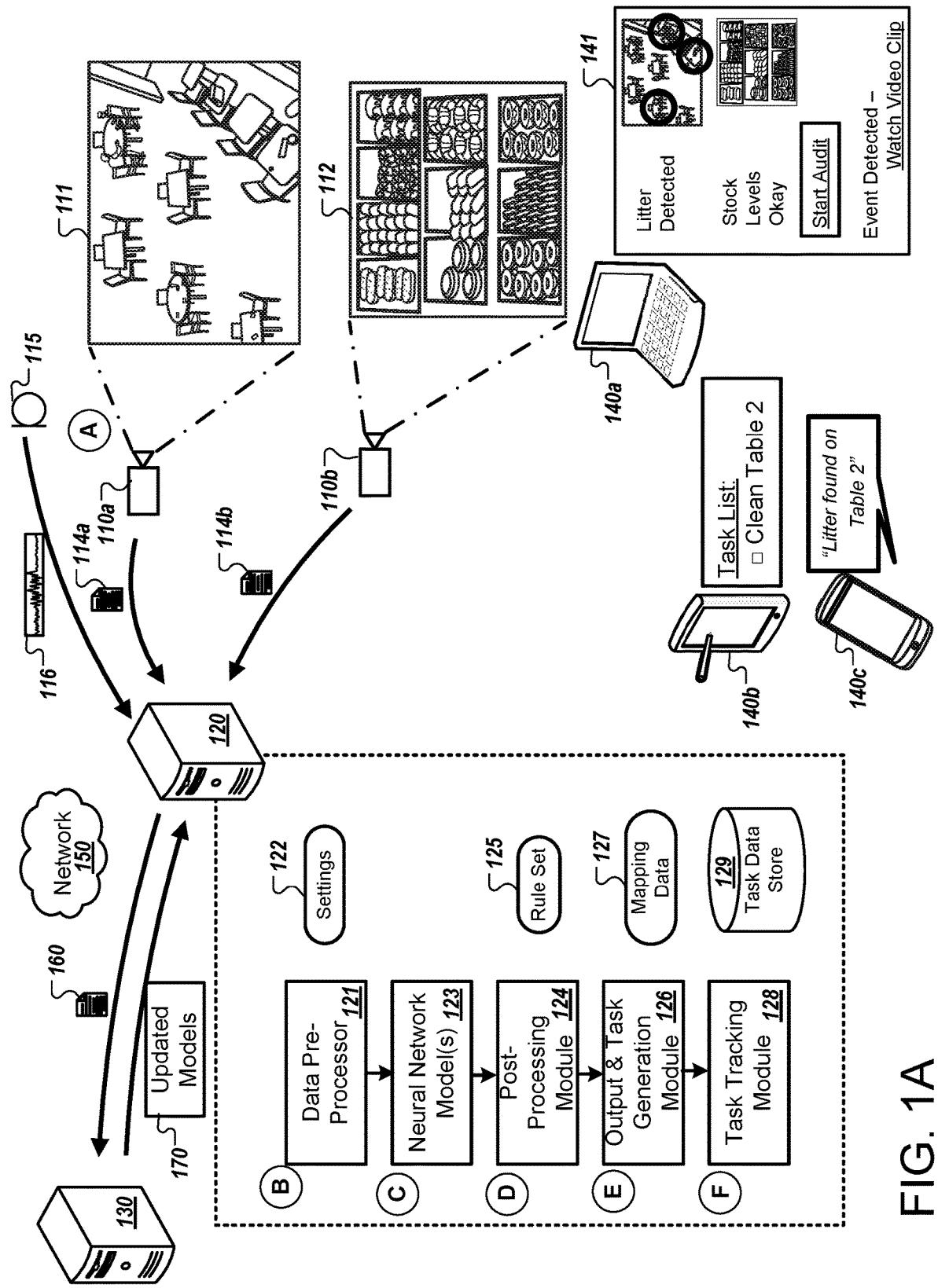
FIG. 1A is a diagram showing an example of a system for status monitoring using machine learning and machine vision.

FIG. 1A is a diagram showing an example of a system 100 for status monitoring using machine learning and machine vision. The example discussed below shows these techniques applied to a restaurant setting, but the same techniques can be used to monitor and address conditions at stores, parks, office buildings, and other locations.

The system 100 provides uses artificial intelligence and machine vision to detect various conditions and issues. The system 100 can operate using data from cameras placed to capture images of public areas, such as retail stores, restaurants, and so on. For example, the technology can use in-store camera feeds to detect quality and consistency issues, such as empty display cases, marketing material placement, leftover food on tables, or overflowing trash cans. The system 100 includes many different aspects that can improve the efficiency of operations. The system 100 can be configured to detect and determine the locations of predetermined types of issues, but can additionally or alternatively be used to detect departures from the typical and desirable state of the monitored area, even if the nature of the unusual condition is unanticipated.

Briefly, the system 100 can provide real-time monitoring of locations and automatic detection of issues using machine learning. The system 100 can provide output in various forms, including real-time alerts routed to appropriate devices or workers, annotated images showing identified issues, and more. The system 100 can automatically generate and assign tasks in order to address the issues detected, then monitor the progress and completion of the tasks using the machine vision platform, providing reminders and status updates along the way. The system 110 can thus provide a full solution to automatically (1) detect undesired conditions that need intervention (e.g., litter on a table, an empty display area, etc.), (2) identify an action to correct or address the undesired condition (e.g., a task to clear a table, replenish a product display area, etc.), and (3) inform one or more workers or other users of the undesired condition and/or the task to be performed. The system 100 can also allow automatic auditing of operations and detection of trends, based on current status and records of previous status.

The issues identified using the machine vision system 100 can be automatically entered into an issue-management and tracking system 100. For example, tasks can be generated to address detected conditions, and those tasks can be added to checklists and other tools. In general, this integration of the machine vision and machine learning system 100 with task management system 100s can improve consistency and efficiency of operations. General operating procedures and specific, real-time tasks can be provided using a tablet, phone, or other mobile device. Mobile device-based checklists can improve employee engagement, task completion, and saves hours of follow-up time for store and district managers resulting in more consistent and efficient operations.

The system 100 can be configured to provide alerts and analytics to provide better control to managers and owners. For example, real-time alerts tell managers when important tasks have been missed so they can address issues before they become a problem. Big data analytics can be used to assess trends in issues detected through the machine vision platform, as well as in the tasks assigned and the manner that those tasks are completed. This information can give managers and owners increased insight into trends and best practices at their stores. Real-time reports, daily emails, and operations benchmarks help managers and owners make better operating decisions every day.

As discussed further below, the system 100 includes technology to automatically assess the status of locations using images, video footage, and audio footage. The image and audio data can be obtained from cameras installed specifically for this purpose, or from existing camera and microphone systems (e.g., used for security monitoring). There are many use cases for the technology. One example, is monitoring display case inventory. The system 100 can evaluate the status of display cases in stores periodically, e.g., every minute, every 10 minutes, every hour, etc., and automatically counting the number of in-stock, low-stock, and out-of-stock items. The system 100 can alerting the store in the event that inventory becomes too low. As another example, the system 100 can monitor store cleanliness, so that issues can be addressed promptly to increase customer satisfaction and available seating. For example, for a restaurant, the system 100 can automatically detect litter on tables and notify workers of the issue so it can be addressed promptly. As another example, the system 100 can monitor the presence and status of marketing material. For example, the system 100 can detect if a display screen is out of order, determine whether signs and displays are within appropriate distances and positions to be viewed by visitors, and so on.

In addition to ongoing real-time detection of issues, the system 100 enables periodic and/or on-demand auditing of various conditions or store operations. A set of audit criteria can be provided, and current location data and historical data can be compared with the audit criteria to determine if standards are being met. For example, a restaurant may set a standard of clearing unoccupied tables of litter within some target amount of time, e.g., 5 minutes or 10 minutes after customers have left. The system 100 can apply this criterion to current images from restaurants to determine how many table currently have litter and have been unoccupied for at least the threshold amount of time. Similarly, the system 100 can audit various periods of time using records of issues identified by the machine learning system 100 as well as corresponding records of cleaning tasks assigned and completed. This can allow the system 100 to determine, for example, how many tables were cleared within the threshold amount of time and how many were not, over different time periods, such as over the last day, week, or month. Data can be broken down by the system 100 in various ways by time, location, by employees, and other factors. For example, the system 100 can determine and provide results by time period, by shift, by employee or manager on duty, by store location, by location within a store (e.g., to highlight if certain areas or tables within a store are handled differently), and so on. The system 100 can store information for any of the various conditions that the machine vision platform is configured to detect, and for any of the tasks assigned, allowing audits of any of these items.

The automated monitoring, issue detection, and issue tracking and resolution that the system 100 provides can be helpful for a variety different stores and industries. For example, the system 100 can be used to assist quick service restaurants (QSR) in maintaining consistent, efficient operations. Examples of quick service restaurants include McDonald's™, Dunkin'™ Brands, Wendy's™, Taco Bell™, and Panera™ though there are of course many others. The system 100 also be employed to assist convenience stores and pharmacies, for example, retail stores such as CVS™, Walgreens™, Speedway™, and others. The system 100 can also be very helpful for grocery stores, such as Walmart™, Kroger™, Safeway™, etc.

The system 100 includes cameras 110*a*, 110*b*, a local computer system 120, a remote computer system 130, and various client devices 140*a*-140*c*. The various devices communicate over a network 150, which can include public and/or private networks and can include the Internet. FIG. 1A also shows a series of stages, labelled (A) through (F), which represent a flow of data and operations that can be performed in the order shown or in a different order.

In the example of FIG. 1A, machine vision and machine learning are used to detect the status of areas of a restaurant in real-time and provide feedback to various workers at the restaurant. The system 110 has been set up with the cameras 110*a*, 110*b* and a microphone 115 installed, and with the computer system 120 having trained machine learning models loaded and ready to classify and predict whether a set of predetermined conditions are present. As discussed further below, the machine learning models can be trained so that, given image data, the models can detect the locations of objects in the image data, classify the status of the objects in the image data, and provide confidence scores indicating the confidence in the detection and status classification. The system 100 can then use the output of the machine learning models to automatically create, assign, track, and otherwise manage tasks to cause any unfavorable conditions to be corrected.

In stage (A), sensors capture information about the current status of an environment. For example, the cameras 110*a* and 110*b* capture image data of a location. The cameras 110*a* and 110*b* are arranged to capture different views of a public area, such as a restaurant. The camera 110*a* captures an image 111 of a dining area of a restaurant, and the camera 110*b* captures an image 112 of a display case showing food available at the restaurant. The cameras 110*a*, 110*b* can be fixed in position to allow repeated image capture and video for a consistent field of view of their respective areas of the restaurant. The cameras 110*a* and 110*b* respectively provide image data 114*a*, 114*b* representing the images 111, 112 to the computer system 120. Various different types of cameras can be used. For example, a few providers of cameras that can be used include Envysion™, DTIQ™, March Networks™, Google™ Nest Camera, and Amazon™ Cloud Cam.

The system 100 can include other sensors used to monitor an environment. For example, the system can include a microphone 115 configured to detect audio and send audio data 116 to the computer system 120. One or more microphones 115 can be located to detect, for example, ambient sound in an area, conversations of employees (e.g., clerks taking orders at the register), or other audio in the restaurant.

In stage (B), the computing system 120 processes the sensor data and generates input for one or more machine learning models. For example, the computing system 120 receives the image data 114*a*, 144*b* and the audio data 116 and can use a data pre-processor 121 to extract feature values to be provided as input. The data preprocessor 121 may perform a variety of other tasks to manipulate the sensor data and prepare input to the neural networks, according to a set of predetermined settings 122. These settings 122 can be customized for the particular restaurant and even for individual sensors (e.g., to use different settings for different cameras 110*a*, 110*b*). To facilitate data processing, each set of sensor data is associated with an accompanying set of metadata that indicates, for example, a timestamp indicating a time of capture, a sensor identifier (e.g., indicating which camera, microphone, etc. generated the data), a location identifier (e.g., indicating the particular restaurant, and or the portion of the restaurant where the sensor is located), and so on.

In stage (C), one or more machine learning models 123 process the input data representing the sensed parameters of the environment of the restaurant. For example, the models 123 can be neural network models that have been trained to perform various classification tasks. In some implementations, different models are used for different types of applications. For example, one model may be trained to process data representing images of a dining area and another model may be trained to process data representing images of display cases. Different applications and different areas may involve detecting different types of objects with different status classifications. For example, one model configured to detect people, chairs, tables, food, and litter can be used to process image data 114*a* for the dining area, and a different model configured to detect different types of food, amounts of food present, and display areas can be used to process the image data 114*b* for the display case. Another model or set of models can be used to process input from the audio data 116, for example, to detect whether noise levels are above a threshold level or whether a worker at a store said a predetermined word or phrase of a script for assisting customers.

The models 123 can include convolutional neural network models. The models 123 may be trained to perform multiple tasks, such as to detect a spatial location that an object occurs in image data, to recognize the type of object present, and to determine a status of the object. For example, a model 123 for monitoring the dining area may be trained to detect chairs and tables, to indicate the locations that the detected objects occur in an image, and to indicate the status of the objects (e.g., whether a table is occupied or unoccupied, whether the table has litter present or not, whether the table is clean or dirty, etc.). The output of the models can include a confidence score for the detection of objects and/or the status classifications given. The models can provide information about the location of a detected object in any of various forms. For example, the location may be indicated as coordinates for a bounding box in an image (e.g., upper left and lower right corners that define the bounding box), a set of vertices defining a region of an image, a center point accompanied by an indication of size (e.g., a radius or indication of one of multiple size classes), and so on.

In some implementations, the models 123 that process image data can use the faster R-CNN object detection and recognition framework. This technique involves an object detection network and a region proposal network that can use region proposal algorithms to hypothesize object locations. To improve efficiency, the region proposal network (RPN) can be arranged to share full-image convolutional features with the detection network, thus enabling nearly cost-free region proposals. An RPN can be a fully convolutional network that simultaneously predicts object bounds and objectness (e.g., a score indicative of how likely the region represents any of multiple types of objects as opposed to background or areas not of interest) at each position. The RPN is trained end-to-end to generate high-quality region proposals, which are used by Fast R-CNN for detection. The RPN and Fast R-CNN can be merged into a single network by sharing their convolutional features. For example, the combined network can use an attention mechanism the RPN component can indicate to the unified network where to look in a convolutional feature map to obtain data to classify an object.

In general, convolutional feature maps used by region-based detectors, like Fast RCNN, can also be used for generating region proposals. On top of these convolutional features, an RPN can be constructed by adding a few additional convolutional layers that simultaneously regress region bounds and objectness scores at each location on a regular grid. The RPN is thus a kind of fully convolutional network (FCN) and can be trained end-to-end specifically for the task for generating detection proposals.

The system can generate "anchor" boxes that serve as references at multiple scales and aspect ratios. To unify RPNs with Fast R-CNN object detection networks, training can alternate between fine-tuning for the region proposal task and then fine-tuning for object detection, while keeping the proposals fixed. Alternatively, the region proposal layers and object detection layers may be trained jointly.

The R-CNN method trains CNNs end-to-end to classify the proposal regions into object categories or background. R-CNN mainly acts as a classifier, and it does not predict object bounds (except for refining by bounding box regression). Fast R-CNN enables end-to-end detector training on shared convolutional features and shows compelling accuracy and speed.

The Faster R-CNN system is composed of two modules. The first module is a deep fully convolutional network that proposes regions, and the second module is the Fast R-CNN detector that uses the proposed regions. The entire system is a single, unified network for object detection. The feature maps generated through convolution can be provided to both the object detection classifier and the region proposal network. The output of the region proposal network can also be provided as input to the classifier portion, so that the classifier portion acts on both the convolution feature maps and the region proposal outputs, which can serve to help the classifier interpret the feature maps. In a sense, the RPN module tells the Fast R-CNN module where to look.

A Region Proposal Network (RPN) takes an image (of any size) as input and outputs a set of rectangular object proposals, each with an objectness score. The objectness score acts as a class-generic object detector. It quantifies how likely it is for an image window to contain an object of any class, e.g., any of the multiple types of objects of interest, as opposed to backgrounds. To generate region proposals, the model slides a small window over the convolutional feature map output by the last shared convolutional layer. This small network takes as input an n by n spatial window of the input convolutional feature map. Each sliding window is mapped to a lower-dimensional feature with rectified linear units (ReLU) applied afterward. This feature is fed into two sibling fully connected layers—a box-regression layer and a box-classification layer. Because the mini-network operates in a sliding-window fashion, the fully-connected layers are shared across all spatial locations. This architecture is naturally implemented with an n by n convolutional layer followed by two sibling 1 by 1 convolutional layers.

The models 123 may be structured and trained as further discussed in R. Girshick, "Fast R-CNN," in IEEE International Conference on Computer Vision (ICCV), 2015 and Shaoqing Ren et al., "Faster R-CNN: Towards Real-Time Object Detection with Region Proposal Networks," IEEE Transactions on Pattern Analysis and Machine Intelligence (Volume: 39, Issue: 6, Jun. 1, 2017), which are incorporated by reference herein.

Other types of machine learning models can be used as the models 123, in addition to or instead of neural networks, for example, decision trees, maximum entropy classifiers, support vector machines, regression models, clustering models, and so on.

The models 123 may further extend typical region proposal and object detection networks by incorporating the prediction of object status into the overall model 123. For example, rather than simply detecting the presence of a chair in an image and providing a bounding box for the location of the chair, the models 123 may additionally classify the chair according to an occupied status (e.g., whether the chair is currently occupied or unoccupied), a cleanliness status (e.g., whether the chair is clean and free of litter or not), an appropriate positioning status (e.g., whether the chair is appropriately placed and oriented or not), and/or according to other status parameters. This determination of status can be made for any and/or all of the types of objects that the models 123 are trained to detect. For example, for a person, the models 123 may be trained to classify the activity of the person, e.g., to provide outputs indicating likelihoods whether the person is eating, waiting, ordering, passing through, etc. In addition, the models 123 can be configured to distinguish workers from customers, for example, and indicate whether a worker is present and if so, where the worker is located in the monitored area. This can be helpful to track the presence and movement throughout a location (e.g., over various different views of a store or restaurant) over time. As another example, the models 123 may classify a passage way as open, in use, or blocked.

The models 123 may be structured to indicate for status classifications in any of multiple ways. For example, the models 123 can provide outputs that provide probability distributions over the different classification options. There may be one probability distribution for whether an object is clean or dirty, another probability distribution whether an object is available or in use, and so on. In this manner, the object detection outputs can be supplemented by and accompanied by status classification outputs corresponding to the indications of detected objects. As another example, the classes of objects detected may be integrated with status determinations, for example, a chair that is occupied can be considered a different object from a chair that is unoccupied, such that the system incorporates into the object classification prediction a prediction about one or more status classifications of the detected object.

The models 123 can be configured to detect different types of objects, conditions, or situations. As noted above, models 123 can be trained to detect the presence of an object in an image, to determine the location of the object in the image, and to determine a status classification for the object from among multiple different possible status classifications. Not all implementations need to provide all of this information, however. For example, some models 123 may be configured to detect certain conditions, such as a table with litter on it, without specifically identifying the location of that table. A model 123 may simply classify the image as a whole as representing the status of a table with litter on it. Multiple status classifications can be provided for a single image.

In some implementations, the models 123 can be configured to detect conditions that are unusual, even if the conditions have not been observed before. In addition to or instead of detecting specific objects or classifications, the models 123 can determine whether the image data shows a state that is inconsistent with normal or expected states of the monitored area. As discussed above, the models 123 can be trained to detect predetermined categories of conditions, such as litter on a table, a table being occupied, etc. In addition to or instead of this, one or more models 123 can be trained to detect when an image of a monitored area shows a condition that is outside the range or set of normal, acceptable variation in the state of the monitored area. In many cases, the system 100 is used to monitor areas such as retail stores or restaurants during business hours. Customers frequently move around and interact with the monitored area, so simply detecting movement or a change in the image data is not sufficient to determine whether attention and intervention of a user is needed. Rather, the machine learning models 123 can learn, from example image data, what properties or conditions are typical for a monitored area, so that the models 123 can detect when a condition occurs that differs from or is inconsistent with the typical conditions or properties of the monitored area.

One or more of the models 123 may be configured to detect an abnormal condition, e.g., a deviation or departure from the typical range or pattern for the monitored area, even if the model 123 has not been trained to detect what the abnormal condition is. For example, in addition to or instead of detecting specific predetermined objects and their conditions, the model 123 may be able to simply classify an image as being representative of the normal or expected states or usage of the monitored area or not. When the models 123 classify an image as being atypical, the system 100 can provide output indicating that attention is needed, without necessarily identifying the cause or nature of the change. For example, an alert can be sent to users, e.g., "attention needed," "please check area near table 2," or "abnormal condition detected in monitoring area."

The functionality to detect the overall image as a whole not being representative of the desired range of states for the location can be one of the ways that the system 100 can detect new conditions that were not observed during training and were not in any predefined set of classes. For example, if a table is tipped over, the training data may not have specifically shown that condition or given a status label for specifying that condition. Similarly, spills of food or drinks may have different locations, shapes, sizes, and colors that are not easy to predict or recognize. Nevertheless, for these types of conditions, the model 123 may still detect that the state of the monitored area is in the expected state or range of variation that encompasses normal operation (and potentially expected changes, such as increased traffic, etc.), and may thus classify the image as representing a condition of the monitored area that needs attention. This can provide a default "catch all" option to detect conditions inconsistent with normal or expected states or uses of the monitored area that need attention or intervention, indicating that something may be wrong and a user should check it out, even if the type of deviation from the normal or expected state is not known. Images showing typical or expected variations in the appearance of the monitored area (e.g., different positions of customers, trays, chairs, etc., typical movement patterns, etc. that commonly occur or would be expected to occur) will still be classified as not requiring attention or intervention.

To detect deviations from the baseline or desired states of the monitored area, the system 100 can capture example image data for the monitored area captured at different times and showing different situations that show normal or expected states (e.g., desirable or acceptable states) of the monitored area. This may include, for example, images of a restaurant seating area at many different times during normal use, so that images show different combinations of people, food, and other items at different positions. Images showing conditions that are not in the normal or expected range may also be used, as examples to represent conditions that are not typical and should be classified as such.

In general, the models 123 may be used to determine a classification for the image of the monitored area or a specific portion of the image. This can include determining a classification for one or more properties of the monitored area or specific objects. When determining a status or classification is discussed herein, the models may do so in any of various ways. One way is indicating a specific classification decision or selection of a classification. Another way is providing a set values that indicate the respective likelihood that the classification is appropriate (e.g., a score of 0.7 for a table being dirty, a score of 0.2 for the table being occupied, and a score of 0.1 for the table being clean and vacant). The models 123 may additionally or alternatively provide regression outputs, such as a value or score along a scale or range rather than a specific classification. For example, rather than classify a shelf among discrete classifications (e.g., empty, low-stock, medium-stock, or full), the models 123 may output a score along a range indicating the stock level (e.g., 53%) or give a score indicating a likelihood or urgency of checking or correcting the stock level (e.g., a 60% confidence score that the shelf should be restocked, or a priority score of 4 on a scale of 1 to 10 indicating the importance of checking the shelf). As another example, the models 123 can provide a score for the monitoring area as a whole or for individual objects or regions within the monitored area for different properties, e.g., occupancy, cleanliness, orderliness, etc. The computer system 120 can then use the scores for these different properties and compare them to thresholds or baseline levels for the properties for the monitored area to determine if the monitored area is in a condition that requires attention or intervention.

During stage (D), the computer system 120 processes the outputs of the models 123 using a post-processing module 124, which can filter or otherwise adjust and interpret the results from the models 123. For example, the module 124 may access a set of rules 125 that indicate rules and thresholds for the post-processing actions. These rules and thresholds may be different for different locations (e.g., different restaurant buildings) and for different models 123, and can even be tailored for specific cameras 110a, 110b. The post-processing module 124 actions can remove detected objects that have confidence scores less than a threshold indicated by the rule set 125. As another example, the post-processing module 124 can identify regions of detected objects and determine areas of overlap. When two detected objects are determined to overlap by a minimum amount, the module 124 can remove the object that has the lower confidence score. As a result of the post-processing, the computer system 120 obtains a filtered list of detected objects, with their locations in the image data and their status classifications. In some implementations, the filtered list of detected objects can be provided as a JSON object with object and class keys. The JSON object can include an array of objects detected, and for each detected object, location data (e.g., a bounding region such as coordinates of two corners along a diagonal of a bounding box), a center location, a size or shape, etc.), status classification data, and one or more confidence scores.

In some implementations, the machine learning models 123 indicate conditions that are detected or predicted to be present in the monitored area. Even so, the computer system 120 can evaluate the confidence scores and other data to verify that the detection is accurate before the computer system 120 will consider a condition needing attention to be detected. In some implementations, the processing and evaluation of model outputs can be a primary or secondary way to detect conditions in the monitored area. For example, the models 123 can provide output scores indicative of different properties of the monitored area, e.g., level of litter present, cleanliness, occupancy, speed that people progress through a waiting line, etc. The computer system 120 can then evaluate whether these scores represent an issue that needs to be addressed by a user. This can be done by comparing scores to corresponding threshold or corresponding baseline values typical for the monitored area. For example, if a cleanliness score is below a predetermined level or if the level of litter present is above a predetermined level, and potentially has been at that level for at least a threshold minimum amount of time, the computer system 120 detects an issue to be addressed.

The computer system 120 can also use other processing of the machine learning outputs to determine when the state of the monitored area needs to be reviewed or corrected. For example, the models 123 may indicate objects detected, and may indicate that 10 tables are present. The computer system 120 can have data indicating the desired or typical number of tables for the monitored area, e.g., from a reference value specified by a user or from a historical reference (e.g., a number of tables present over the last day, week, etc.). The computer system 120 compares the number of detected tables, e.g., 10, to a number of tables indicated by the reference value, e.g., 12, and so can determine that there is a condition needing intervention (e.g., the arrangement of the tables needs to be corrected). In this manner the computer system 120 can use the outputs of machine learning models 123 to determine whether the state of the monitored area is inconsistent with a baseline state. Thus, the models 123, may not be required to distinguish abnormal conditions from normal or expected ones (although they may be trained to do so in some implementations), and may simply characterize or describe the properties or state of the monitored area. Further processing of the computer system 120 to determine when and whether the set of properties indicated by the models 123 rises to the level of a condition for which a user needs to be informed and a task or other corrective action performed.

In stage (E), the computer system 120 uses an output and task generation module 126 to generate output to indicate the detected objects and conditions. From the list of detected objects and status, the computer system 120 may also evaluate which of these detected objects, or combinations of them, represent conditions that need to be addressed. In some cases, a single detection of an object, such as a table with litter on it, may represent a condition about which to notify a worker at the restaurant. In other cases, detection of a certain combination of objects, such as more than a threshold number of people waiting in line, is detected as a condition to be addressed. The computer system 120 can extract, from the list of detected objects, statistics and measures about the different objects detected and apply rules, threshold, or other evaluation techniques to determine whether certain issues are present in the restaurant. Not every detected object and status classification warrant an output to a user. For example, identifying that 2 of 10 tables are occupied or that 8 tables are clean does not represent a condition that requires attention, and the output generation rules can be set to reflect this. On the other hand, determining that 9 of 10 tables are filled or that 3 tables are dirty may represent conditions that require attention and correction, and so the output generation rules can reflect this also. In this manner, the computer system 120 can distinguish between conditions (and combinations of conditions) that require notification to a user and intervention by a user and conditions that do not.

The module 126 can provide various types of outputs to indicate detected objects and conditions. Examples include notifications, alerts, e-mails, text messages, entries in a log, text, indicators on a user interface, outputs over a network using an application programming interface, images 111, 112 and annotations or overlays to indicate the detected conditions, and so on. In general, the computer system 120 can cause one or more of the client devices 140a-140c to provide audible output, visual output, or haptic output to indicate detected conditions at the restaurant. The type and nature of the output can be selected based on the type of condition detected and a determination of one or multiple priority levels to the detected condition.

The module 126 can access mapping data 127 that maps different conditions to different types of outputs, different priorities, and different devices, users, and/or roles at the restaurant that should receive the outputs. In the example, the example of FIG. 1A, the client device 140c is issued an alert causing it to produce an audible output that "Litter is found on Table 2." The client device 140b has an entry added to a task list, indicating that Table 2 should be cleaned. The client device 140a has a user interface 141 that includes a variety of information about detected conditions, including (1) copies of the images 111, 112 with annotations overlaid to indicate the locations and types of issues detected, (2) indications of the status detected (e.g., litter detected, stock levels okay), (3) one or more controls to request additional information (e.g., initiate an audit), and (4) an indication that an event was detected and a control to view video of the event. The user interface 141 can represent a native application, a web application, a web page, or another interface.

One of the functions of the module 126 is to generate and assign tasks to address detected conditions. For example, the module 126 determines based on the filtered results from the neural network models 124 that litter is present in a particular portion of the image 111 classified as being a table. The module 126 can use the location information (e.g., bounding region) in the image data to identify a name of the table, e.g., Table 2, and determine that this status classification justifies creating a task to perform corrective action. In response, the module 126 generates a new task "Clean Table 2" and assigns it to be completed. The task can be assigned in various ways. For example, the task may appear in a manager's interface, and the manager can chose to carry out the task or delegate the task to another worker. As another example, the computer system 120 can store information indicating workers and their responsibilities in the restaurant, can determine which worker has responsibility for the area (e.g., Table 2) and/or the task type or condition (e.g., cleaning or dealing with litter), and can then select an appropriate worker to assign the task to. In this case, the assigned worker can be notified, for example, with a message sent to an electronic address, device, logged-in application, or other functionality associated with the selected worker. Information about the assigned task can also be added to a checklist or task list that is provided to a manager or other workers.

This functionality of the computer system 120 to automatically generate and assign tasks to address detected conditions is a significant feature of the system. The tasks can be localized to a specific region of the monitored area, such as to a region with a predetermined identifier (e.g., table 2, east doorway, etc.) or simply to a region shown in a monitoring image (e.g., by annotating a portion of an image with shading, highlighting, a bounding box, etc.). As discussed above, the computer system 120 can also detect a variety of different types of conditions needing intervention.

In stage (F), a task tracking module 128 tracks progress of assigned tasks over time. The computer system 120 stores the information specifying the pending and completed tasks in a task data store 129. As new images are captured by the cameras 110a, 110b and processed using the machine learning models 123, the task tracking module 128 can evaluate the object detection and status classification outputs to determine whether detected conditions that prompted the creation of the tasks are still present. Even when tasks have been marked as complete, the module 128 can evaluate whether the detected objects and conditions corroborate that the task is complete or not. When tasks are not performed within a threshold amount of time, the module 128 can cause reminders or notifications to be provided, can increase a priority level of pending tasks, and otherwise increase visibility of the task to workers. The module 128 can store, in the task data store 129, records of times that tasks were determined to have been completed. This data, stored over-time, can be used to provide a variety of analytics data for the restaurant. For example, the computer system 120 may provide information that indicates, for each of different conditions that the system 100 is configured to determine, how frequently the condition occurred (e.g., counts, patterns, and trends of when the condition occurred), how tasks to correct the condition were carried out (e.g., how quickly tasks were completed after being assigned), and differences in occurrence of the condition and differences in completion of corresponding tasks for different time periods, different regions of the restaurant, different employees assigned to complete the tasks, and so on.

The operations discussed for stages (A) to (F) can be repeated on an ongoing basis to continually monitor the restaurant. For example, the steps may repeated at a regular interval, such as every second, every five seconds, every 30 seconds, every minute, every 5 minutes, etc., or at another interval appropriate for the location. This can allow real-time monitoring of the restaurant, with conditions being detected and reported very quickly after they occur and while the conditions are still present.

The computer system 120 can periodically provide data 160 to the computer system 130 which can be used to further train the neural network models 123 as well as models used for other locations. The data 160 can include image data 114a, 114b and associated metadata, outputs of the neural network models, and actions taken by users. In some implementations, actions that users take after seeing output indicating detected objects and conditions can provide positive or negative feedback about predictions of the models 123. Some feedback may be explicit, such as indicating that a status or an object classification is correct or incorrect. Other feedback can be implicit. For example, if the models 123 classify a display case as having low stock, but a user dismisses the task to refill the display case, this may be at least a weak signal that the "low stock" status classification may be incorrect. On the other hand, detecting that stock was subsequently replenished after the classification may be a signal that the earlier classification was correct and prompted actions to change the status.

The computer system 130 can retrain copies of the neural network models 130, using data 160 from the restaurant and from examples from other restaurants and other locations. Then, the computer system 130 can provide updated models 170 with a refined training state to the computer system 120, to be used in place of the earlier models 123.

As noted above, the system 100 can use audio data 116 as well as image data 114a, 114b to detect events and conditions at monitored locations. The data can be associated with timestamps so that the system 100 aligns or synchronizes sensor data from different sources, allowing multiple forms of sensor data to be used to detect conditions. For example, if a drink is spilled on the ground, the wet floor may be detected based on analysis of the video data, but the confidence score may be relatively low depending on the lighting, the size of the spill, the angle of the camera, and so on. To confirm the presence of the spill, or to detect one that is not detected from the image data, the computer system 120 can identify the presence of spoken keywords in the audio data 116, for example, using speech recognition models to obtain transcripts of speech or using keyword spotting models to determine the occurrence of specific keywords or phrases based on the acoustic properties. A set of predetermined words and phrases can be associated with different conditions, and the detection of these words in the audio data 116 can be used to detect a condition. For example, the terms "spill," "wet floor," "spilled drink," or "puddle" can be designated in advance as keywords representing the condition of a spill on the floor. When analysis of the audio data 116 indicates that one or more of these keywords was spoken or other recognized sound type has occurred, the computer system 120 can detect the condition of a spill and can generate a task for the spill to be cleaned up. The location of the spill or other condition can be determined generally from the location of the microphone 115 that captured the audio data 116. In addition, the computer system 120 can further localize the condition detected from audio data 116 using the results from the neural network models 123 in processing image data 114a, 114b. For example, output from the models may indicate a region of the floor as dirty at the same time the spill is mentioned, and as a result the computer system 120 can associate the spill condition with the region of the floor indicated as dirty.

In addition, the computer system 120 can be configured to detect certain non-speech sounds, such as glass breaking, humming and other machine sounds, beeps or other device outputs, doors opening or closing, etc., as signals of events or conditions. In a similar manner, the absence of certain sounds may be a signal. For example, the lack of music where there typically is or should be ambient music may signal a condition to be corrected. Similarly, a very quiet dining area of a restaurant during business hours may be detected as a signal that the area is being underutilized.

In some implementations, workers at the restaurant may have a script or standard dialogue to be used when interacting with customers. The microphone 115, or multiple microphones placed to acquire audio data for different workers, may capture audio that the computer system 120 can analyze to determine which elements of the script are being followed. This can be helpful to determine if, for example, cashiers, servers, and others are informing customers of special offers, discounts, new items, and so on. The computer system 120 can have machine learning models 123 that evaluate audio data, or may rely on a remote server to provide the audio processing. Whether done locally or remotely, the audio analysis can determine transcripts for conversations using automated speech recognition and/or can detect the occurrence of specific key words and phrases (e.g., using keyword spotting models trained to detect the occurrence of specific key words).

Information about a conversation script and/or typical interactions with customers can be used to generate natural language examples to be identified in audio. The beginning of a new customer interaction may be detected with certain phrases, e.g., "Hi, welcome to . . . ," which can be part of the script or can be taken from examples of common greetings. As another example, data from a cash register or other terminal may indicate the times that transactions end, and these times may be used to divide the audio data 116 into segments representing interactions with different customers. The audio analysis can look for the presence of words and phrases from the script, for example, whether the worker asked "would you like to add a drink?" As noted above, the audio analysis can be correlated with the transaction data, which can indicate the items purchased. The computer system 120 can thus determine, for example, each of the transactions when a drink was not ordered, whether the workers remembered to ask about a drink. In general, a script may include many different elements, and each element may have various different phrasings or alternative expressions. The system 100 can be configured to detect any of multiple script elements, through the occurrence of any various predetermined words or phrases, to determine which elements were included in conversations, whether the order of the script is followed, and so on.

In general, the results of the audio analysis can be associated with specific employees based on, for example, records of who was logged in to a terminal or register at the time the dialogues occurred, records of who was working during different times or shifts, speaker recognition processing to determine the identity of the speaker (e.g., to match to one of various voice profiles for different workers), and so on.

In some implementations, video feeds or sequences of images from the cameras 110a, 110b can be analyzed by the models 123 to determine if the types of motion or types of changes in the monitored area represent conditions that need attention. This can be helpful to detect events or movement patterns that are unusual for the monitored area.

Figure 1B:
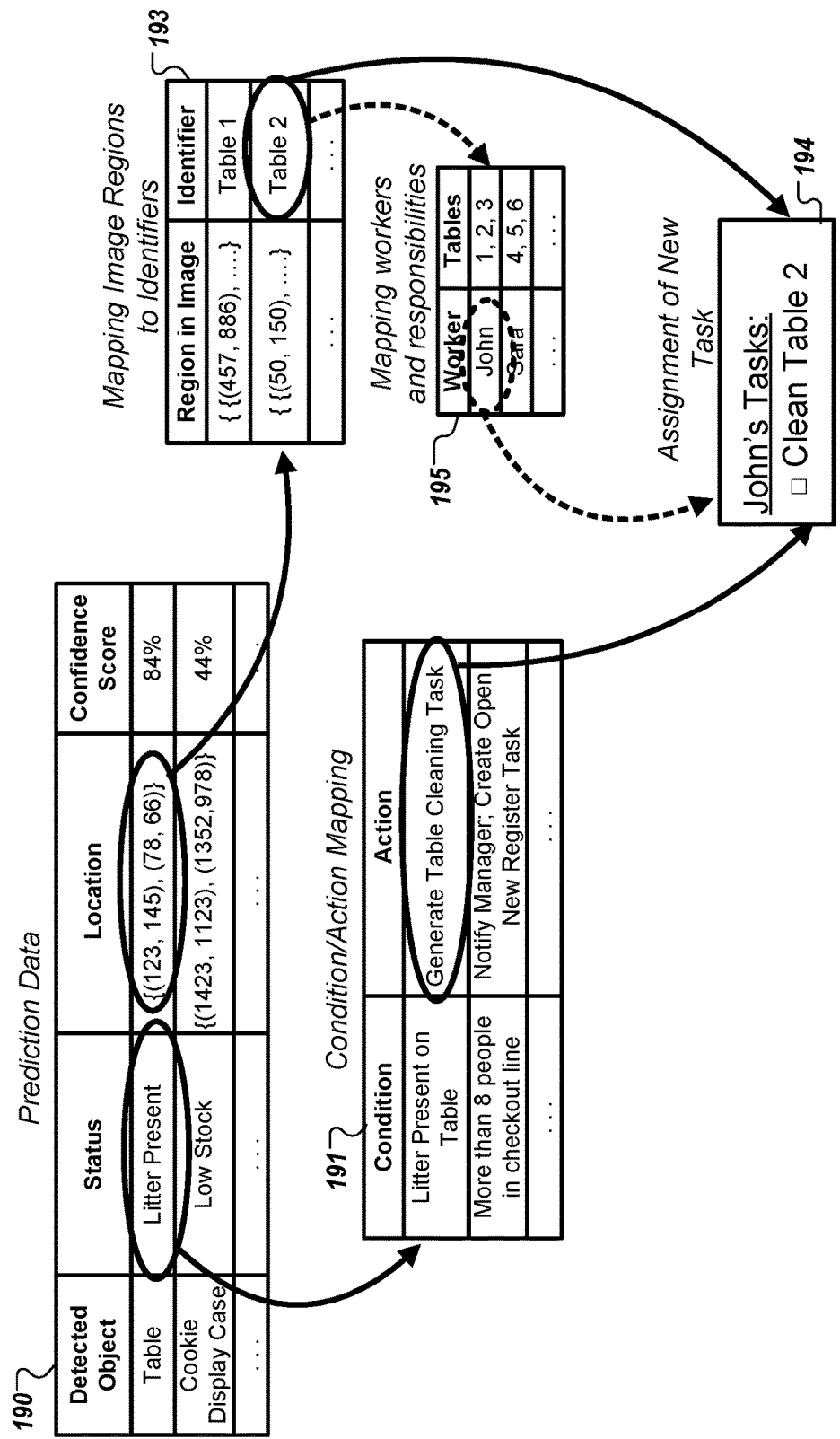
FIG. 1B shows an example of generating a task based on a detected condition.

FIG. 1B shows an example of generating a task based on a detected condition. The example shows prediction data 190 representing output determined by the machine learning models 123. Among the detected objects is a table determined to have a status of "litter present." The computer system 120 uses a set of predetermined criteria to determine that this represents a condition that warrants action by the computer system 120. For example, the computer system 120 can use mapping data 191 that specifies conditions (e.g., detected objects and status classifications, alone or in combination) and corresponding actions for the computer system 120 to perform. In this instance, the detection of a table with litter present is mapped to the action of generating a new cleaning task. The computer system 120 then determines information needed to specify this new task. The mapping data 191 specifies the action type for the new task performed (e.g., cleaning), but additional information is needed to specify the subject or item for the task to act on (e.g., which table to be cleaned).

Using the location data specifying where in the image 111 the dirty table is located, the computer system determines an identifier for the dirty table, e.g., an identifier that a worker would understand. For example, the computer system 120 accesses image region mapping data 193 that specifies labels or other identifiers for objects at different regions of the image 111. Generally, the cameras 110a, 110b are installed in a fixed location with a consistent field of view, and many items such as tables may be fixed in place. Nevertheless, the mapping data 193 may be updated from time to time, for example, as detected items such as tables move and so correspond to different regions of the image field of view. In some implementations, in addition or as an alternative, the computer system 120 may simply provide the image 111 with the location of the condition (e.g., the dirty table) marked, so that the annotated image shows which area should be the subject of the task.

The computer system 120 thus generates a task entry 194 specifying that table 2 needs to be cleaned. The indication of this task (and/or the condition or status identified) may be provided to one or more devices for output. For example, the task can be added to a checklist or task list for one or more workers at the restaurant. As another example, a notification or alert can be provided to one or more workers at the restaurant, notifying them that a new task has been added or specifying the specific new task (e.g., clean table 2).

In some implementations, the computer system 120 may identify a specific employee who has responsibility for this task type or this region of the restaurant. For example, the computer system 120 can access mapping data 195 that maps workers or roles to different responsibilities. In this example, a worker "John" has responsibility for table 2, and so the task is assigned to him. An indication of the new task can be sent to a device associated with this worker. Identifying a specific user or device and providing selective notifications is not required, however. In some implementations, the computer system 120 may provide the task entry 194 for presentation by a computer, television, or other device viewable by multiple workers at the restaurant. For example, all tasks or conditions may be indicated on a shared screen. As another example, workers may be presented a shared list of tasks that may or may not be differentiated or assigned to individuals. For example, a view can be provided that shows the list of highest priority tasks, which may be prioritized based on factors such as importance or severity of the detected status or condition requiring attention, the length of time that the detected status or condition has gone uncorrected, and so on.

In the example, after the condition of "litter present" is detected, the computer system 120 can continue to monitor the associated location and determine if the condition has changed. For example, as the computer system 120 continues to monitor the restaurant, such as at some period such as every 10 seconds, every minute, every 5 minutes, every 15 minutes, etc. At each of these monitoring cycles the computer system 120 can evaluate the collected data to determine if the condition remains. If the condition remains for at least a threshold amount of time, such as 30 minutes, then the computer system 120 can take additional actions, e.g., send a reminder about the condition or associated task, increase the priority of the task to correct the condition, notify an additional worker (e.g., supervisor, manager, etc.), re-assign the task to another worker or assign another worker to help with the task, etc. The computer system 120 can continue to monitor conditions and initiate interactions with users until the undesired condition is removed. Similarly, if a worker marks the task shown in task entry 194 complete, but the associated condition is not removed (e.g., litter still remains on table 2), the computer system 120 can re-open or re-assign the task, send a notification of the situation to a supervisor or manager, or take other actions.

Figure 2:
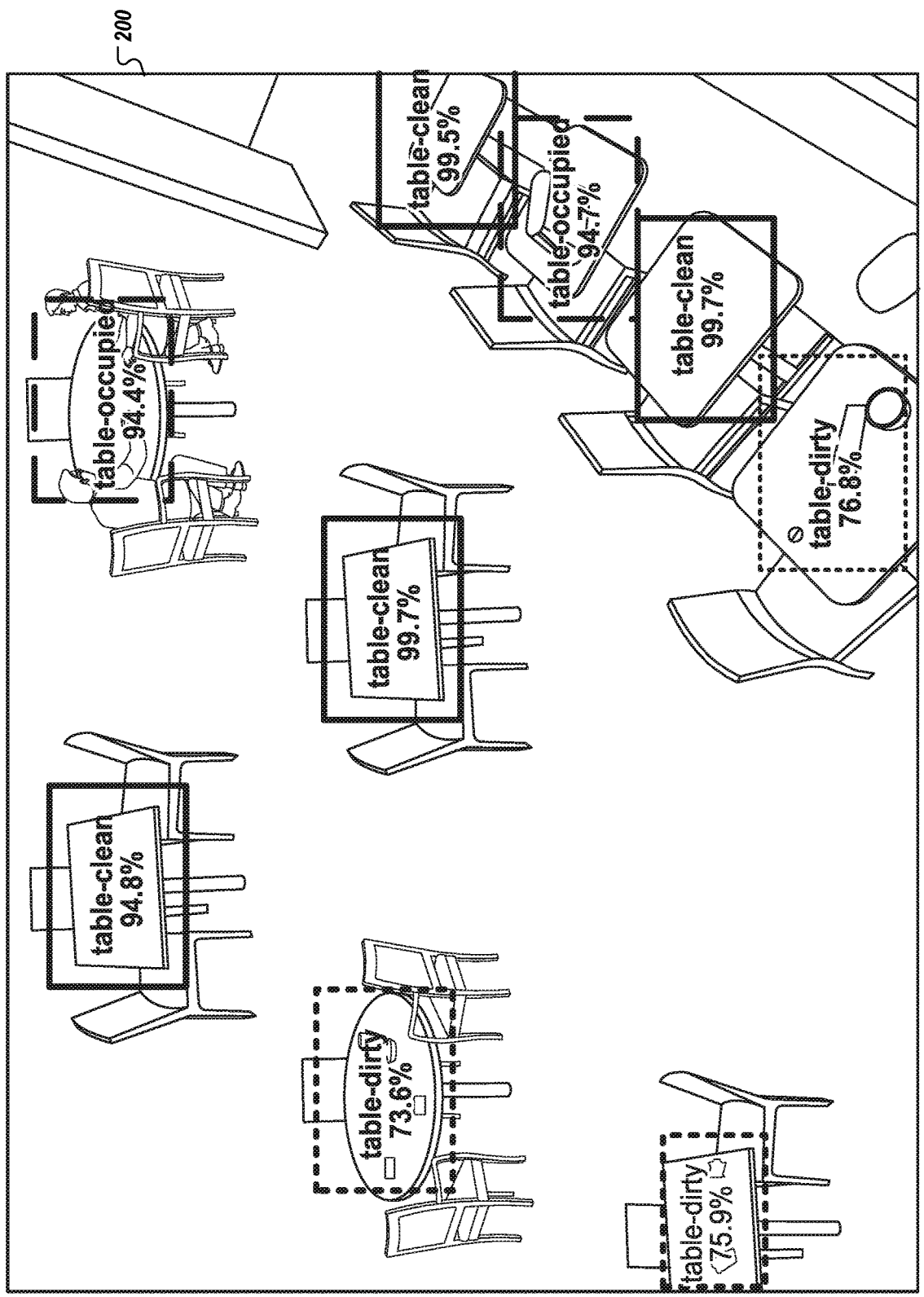
FIGS. 2-4 are diagrams showing examples of images showing annotations based on machine learning analysis.
Figure 3:
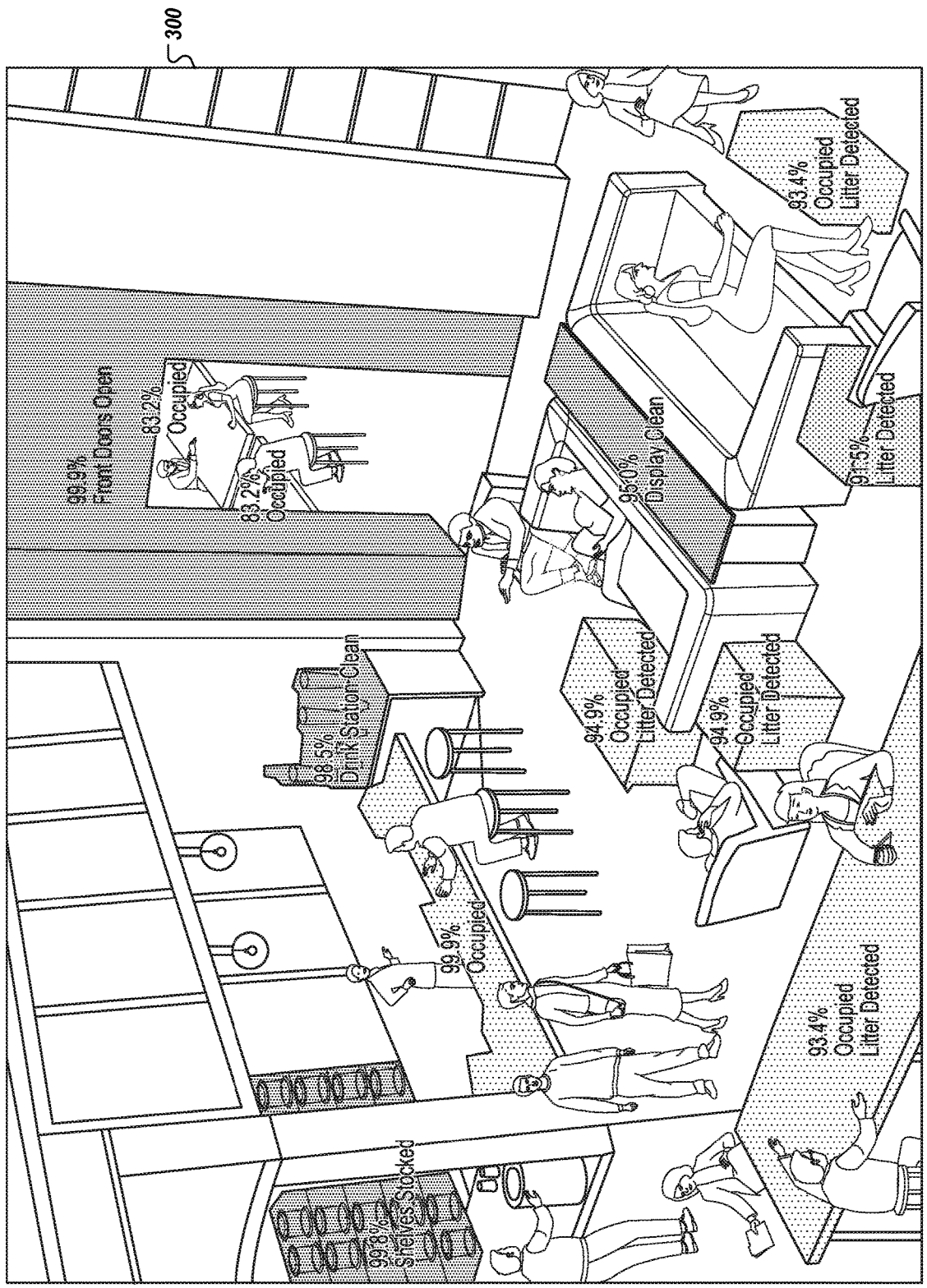
Figure 4:
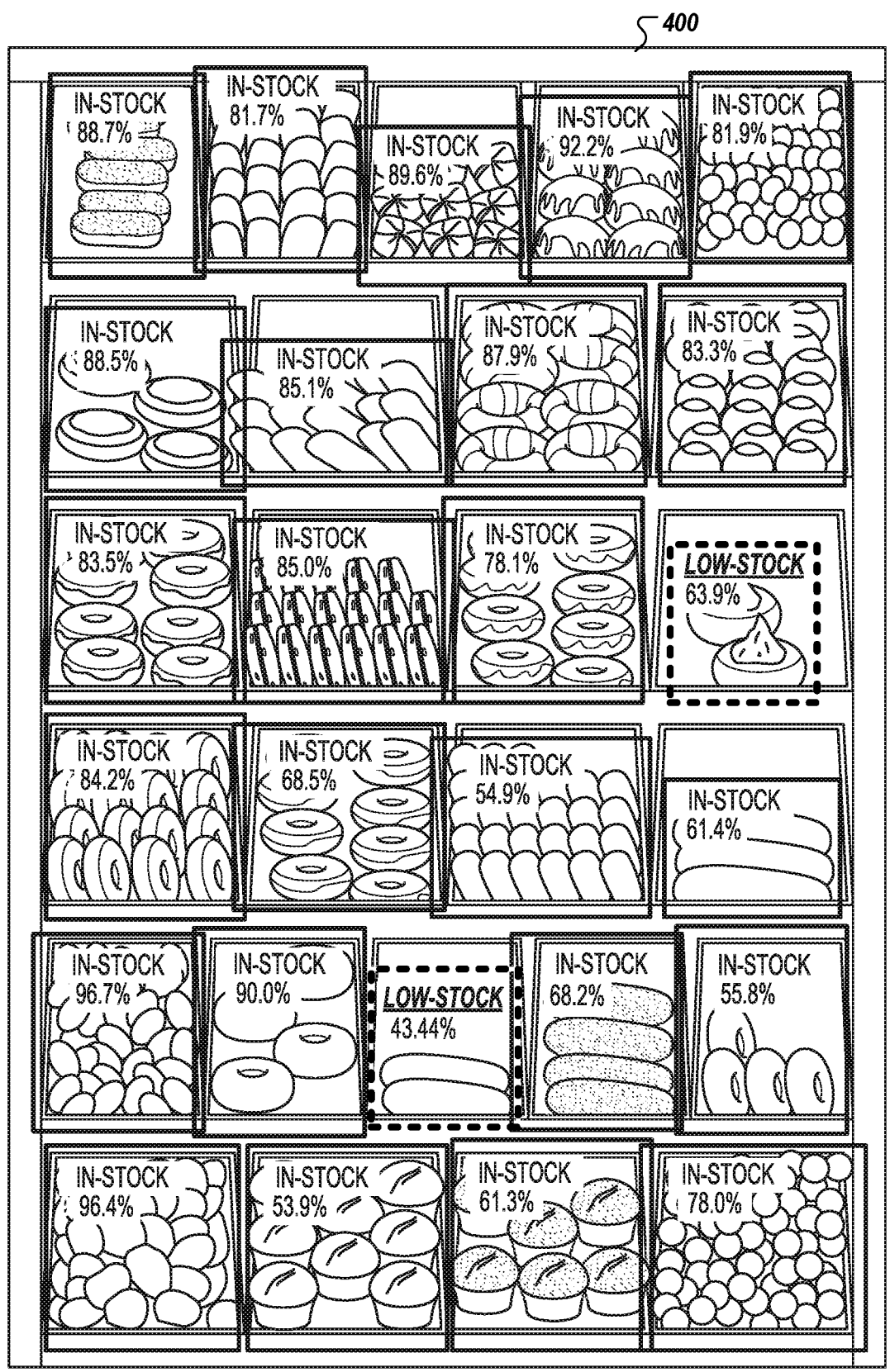

FIGS. 2-4 show example of images that can be provided to users to indicate conditions present at monitored areas. These images and similar images can be pushed to a client device, e.g., sent in a notification message that alerts the user. These images and similar images can additionally or alternatively be made available through interaction with a hyperlink or control in a user interface of a web page or software application, be provided for display on a screen at the location monitored (e.g., for review by a manager or other employee), or otherwise be provided to one or more users. The annotations in the images can be included in the images (e.g., with a single image file including the annotations) to show conditions at a particular point in time, or annotations can be separate overlay elements shown with the image (e.g., through markup language or other overlay techniques) and which can be dynamically updated to show changes in detected conditions.

FIG. 2 is a diagram showing an example of an image 200 having an overlay of annotations indicating results of machine learning analysis. The image 200 shows a dining area, with results of a neural network model that has been trained to detect tables, indicate the locations of the tables in image data, and classify the tables as clean, dirty, or occupied. Each of the identified tables has a bounding box showing the region of the image 200 that the neural network model predicted to correspond to the table. The bounding boxes can have different colors or other formatting to distinguish between different identified classifications. Each table is also labeled with a text annotation with the object type, "table," and status classification, "clean," "dirty," or "occupied." The output of the neural network also indicates a confidence score indicating a likelihood that the model assigns for the prediction being correct.

FIG. 3 is another diagram showing an example of an image 300 having an overlay of annotations indicating results of machine learning analysis. The image 300 shows results of a neural network model that is configured to detect a wider variety of objects than discussed for FIG. 2. For example, the neural network model is configured to detect types of objects including at least shelves, counters, tables, doors, and drink stations. Each of the types of objects can have one or more different status dimensions that are also classified. For example, counters and table may be classified for cleanliness and for occupation separately. Accordingly, for various of the detected objects, multiple status classifications can be provided. The image 300 indicates locations of detected objects not with a bounding box but with shading or other markings that follow the boundaries of the images of the objects in the image 300. This can be done by, for example, running an image segmentation process on the image 300 to identify high-contrast or high-sharpness boundaries in the image 300. The object detection model can indicate predicted regions covering a majority of the objects or a center of the objects. From the center, the shading or other marking may extend outward to the boundaries noted in the segmentation process to cover visible surfaces of an object.

FIG. 4 is another diagram showing an example of an image 400 having an overlay of annotations indicating results of machine learning analysis. The neural network used to detect objects and predict their status is trained to detect different breads, pastries, and other bakery items and the display areas that contain them. The annotations for the image 400 include a bounding box for each distinct display region identified by the model, along with a classification of the display region as in-stock, low-stock, or out-of-stock, accompanied by a confidence score for the prediction. Although not illustrated, the model can also provide an indication of a recognized class or category of object within the display regions, e.g., roll, muffin, doughnut, cookie, etc., or even provide more specific types.

The object types detected and status classifications shown for FIGS. 2-4 are different. Nevertheless, the different models and their functions can all be used together in a monitoring system. For example, a single restaurant might use three cameras providing different views as shown in FIGS. 2-4, with a different neural network model being used to process the image data from each camera. Each neural network can be trained in a manner that tailors it to detect object and status for the particular object classes and status types that are relevant for the region of the restaurant within the view.

In some implementations, each of the neural network models can be generated by starting with a general object detection model, which may be trained to predict many more objects than are relevant for the intended use of the model after training is completed. From this general model, modifications can be made for example, to replace the output layer with a smaller output layer representing the object classes and status classifications that are relevant. In some implementations, beginning with a general object detection model or including pre-training that is not focused on or even does not include the classes to be predicted by the final model may provide the model with a good sense of background objects that are not detected and can increase the overall robustness of predictions. In other words, by training model initially to detect a wide variety of objects, the network can better recognize those object or patterns as representing features (e.g., background) different from the limited set of features that are later trained to be most relevant.

Each neural network model may be trained using labeled training examples showing the types of views that correspond to the model. For example, the model used for FIG. 2 may be trained with labeled examples of many different dining areas of various locations. Similarly, the model of FIG. 4 may be trained using images of various different display cases, store shelves, and so on. Each model may have its training further refined using images from camera at the actual location and field of view that will produce the images processed at the time of inference. This technique of multiple levels of training (e.g., general object detection training, application-specific training for images of multiple locations, and training based on the specific field of view used for inference) can provide high accuracy of prediction with relatively low amounts of location-specific training data being needed. As an example, because the model for display case classification is trained with example of many different types of display cases at different locations, the model learns key feature combinations that are most indicative of display areas and their status. Then, with a model generated to assess images of display cases generally, accuracy of the model for a specific view of a specific display case can be improved using a relatively small set of training data based on actual images for the specific display case to be monitored. In many instances, however, the general model for display cases (e.g., a model trained for a particular application and use, but not customized for a specific location or a specific camera) has sufficient accuracy that it can be deployed to be used for processing data representing any of many different display cases, without having to personalize each model for each location where it is used.

Figure 5:
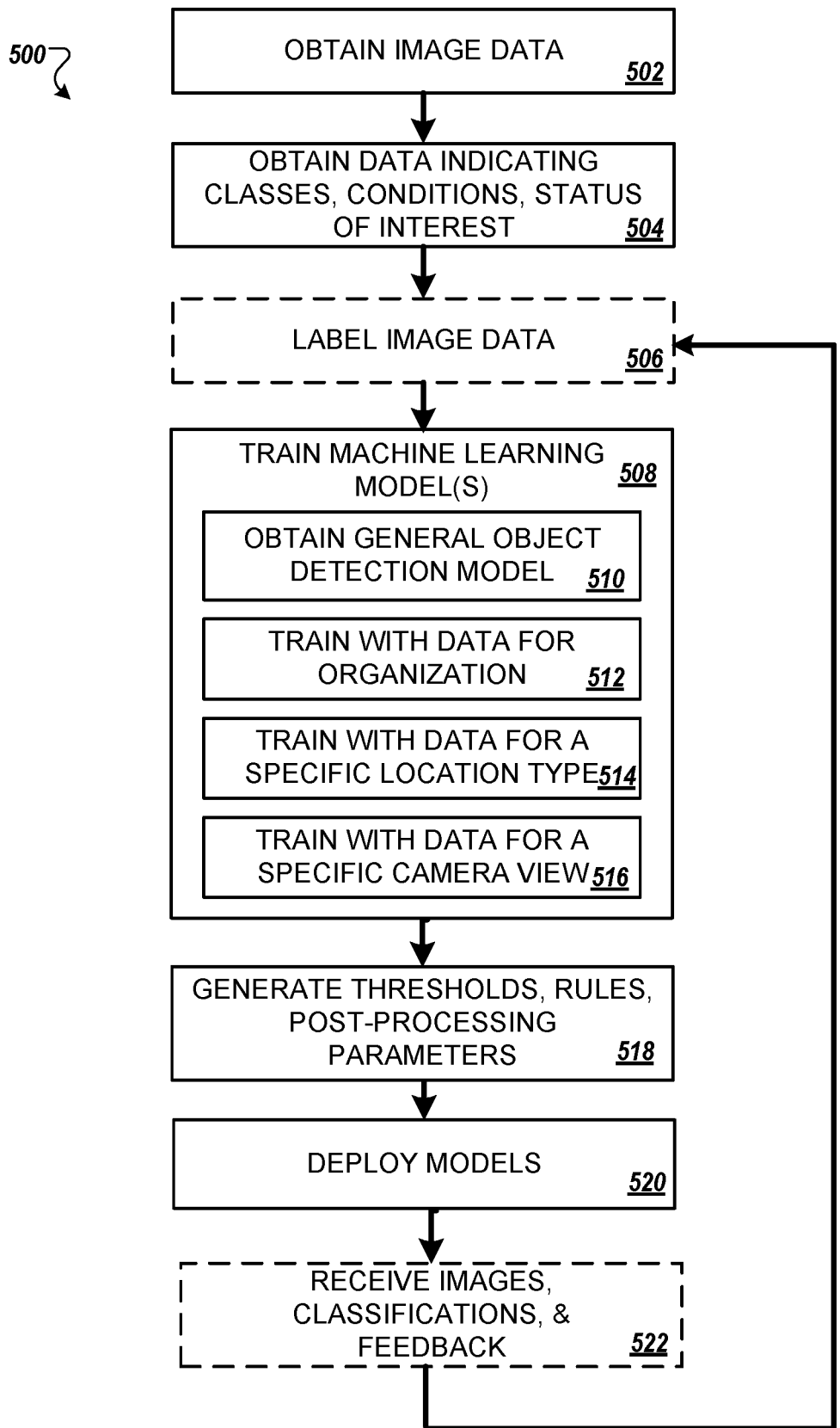
FIG. 5 is a flow diagram showing an example of a process for training machine learning models.

FIG. 5 is a flow diagram showing an example of a process 500 for training machine learning models. The process 500 can include features as described above with respect to FIGS. 1A-4. The process 500 may be performed by one or more computers, such as by the computer system 120.

The process includes obtaining image data (step 502), such as from one or more cameras or other sensors located to capture data about a monitored area. In general, for training, many different images are desirable, including images captured at different times and representing a variety of conditions, and including image showing desirable conditions (such as normal or expected operation or use of the monitored area) as well as images showing undesirable conditions (such as specific items that require attention or deviations or inconsistencies with respect to the typical state or use of the monitored area).

Data indicating classes, conditions, or statuses of interest is obtained (step 504). This can include information about the condition of individual objects or regions of the monitored area and/or for the monitored area as a whole. For example, the data can indicate different conditions of a table in a restaurant (e.g., vacant, occupied, dirty, clean, litter present, etc.) or for an entire room or for the restaurant as a whole. In some implementations, the set of conditions of interest are provided by a user or are accessed by the computer system from a database or list of potential conditions.

The image data can be labelled with the corresponding conditions represented in the image data (step 506). This labeling facilitates training of machine learning models, especially for supervised training. The image data can be labeled as representing or corresponding to any of the classes (e.g., classifications), conditions, status or states, or other items determined in step 504. This can include indicating specific regions or portions of an image that the labeled condition refers to. For example, the labeling can indicate not only that litter is present in the overall monitored area in the entirety of an image, but that the litter is present at a specific portion of the image, such as a specific table. Nevertheless, the labels and data need not be limited to specific portions of an image. In addition to or instead of labels for conditions within an image, one or more labels can be provided for the image as a whole. For example, a label may specify an occupancy level shown in the image as a whole. Similarly, an image may be labeled as showing an acceptable or unacceptable state of the monitoring area as a whole.

In some implementations, images can be labeled using measures that may not be directly shown in the images. For example, images for a restaurant may be labeled with measures of customer satisfaction, revenue, or other factors of interest. These measures can show performance of a store or other location at a time at or near the time the images were captured. As an example, images for a store may be associated with revenue for the store during a time period that may be impacted by current conditions, such as revenue over the subsequent hour.

One or more machine learning models are trained (step 508). This can include supervised training or unsupervised training, or a hybrid approach. In general, the training process can cause a model to learn, based on the examples of the image data, to detect different conditions that may occur in the monitored area. The training may configure one or more models to localize a region in an image (and thus a region of the monitored area) where a condition occurs. The training may additionally configure the models to identify new types of conditions, such as by clustering image data and configuring a model to detect conditions that correspond to those represented in a cluster of image data.

In some implementations, the training includes obtaining a general object detection model (step 510), which can optionally be further trained using any of various different example data sets. The object detection model may be trained further with examples of monitoring data for an organization for which the model will be used (step 512). For example, if the model is to be used for monitoring a McDonald's™ restaurant, example data from various McDonald's™ restaurants can be used, to refine the model for the types of products, store layouts, table arrangements, signage and branding, and other aspects of these restaurants. In addition, the model can be refined to detect the types of conditions or object statuses that are applicable to this type of restaurant (e.g., table occupied, table empty, litter on table, etc.), which a general object detection model would not have been trained to detect. In a similar manner, the training can include training with example data for a specific location type (step 514). For example the model can be trained further using example data showing images of fast food restaurants and conditions shown in the images.

The model can be further trained using data for a specific camera view (step 516). In some implementations, a model is optionally trained or adjusted for each camera or camera perspective. In other words, if a store has three cameras in fixed locations, each providing images of a different region or view of the store, a model can be refined and customized for each camera. The three models can each be based on a same model trained for the purpose of monitoring a store (e.g., for retail stores generally, or for a fast food restaurant more specifically, or even for the specific brand of fast food restaurant). That model can be adjusted differently for each camera, based on images actually acquired using the camera corresponding to the model. In this manner, the training process can leverage a large set of training data for other locations and views, yet provide high accuracy for the specific conditions and layout shown in images from the specific camera.

While some implementations can train models to identify and localize specific conditions (e.g., litter on a particular table, a particular item having low stock, etc.), this level of specificity is not required. In addition or as an alternative, the training may configure a model to determine when the overall state of the monitored area is acceptable or not. For example, the model can be configured to determine whether a monitoring image is different from or deviates from a typical or desired baseline state in a manner that requires attention. The monitoring system is often used in locations and situations that involve frequent movement and changes, such as during business hours while customers coming and going and making varied and often unpredictable movements. As a result, it is generally not sufficient to merely detect movement or a change in an image compared to a prior image, as many changes in images are benign or desirable and do not reflect any need for action. As a result, the models can be trained to distinguish types of variations in images that are within the normal or expected range of conditions (e.g., image data showing different arrangements of people and food around occupied tables) from items in images that show changes that need corrective action (e.g., litter on an unattended table). Even without labeling specific conditions, models can be trained to detect the type of conditions that are inconsistent from or incompatible with a range of different acceptable conditions. This can include training the models to recognize the states and conditions that represent the range of patterns and configurations of the monitored area that are acceptable and do not need action. This can be done, for example, by training a neural network model based on image examples of acceptable and unacceptable states of the monitored area, without necessarily identifying the specific region or type of condition that cause one condition to need attention. Further, with training regarding the typical or baseline range of variations, changes outside the scope of these changes can be identified as needing attention, even if it is a new situation not shown in the training data. For example, although the model may not be trained to specifically identify a condition for a spilled drink on the floor, the model may nevertheless determine that an image showing a spill is different from the desired baseline state and can classify the image as needing action as a result.

Another way to achieve this is to use clustering algorithms to determine clusters of images of the monitored area, where one or more clusters of images represent the acceptable conditions that do not require action. Optionally, clusters can be defined for images that represent unacceptable conditions that do require action. When a new monitoring image is captured, the image is assigned to one of the clusters based on the model, and if the image does not fit with the properties of the one or more clusters representing acceptable conditions (or if the image is assigned to a cluster of unacceptable conditions) the system can determine that the image represents an image that needs attention and potentially correction, even if the specific type or reason for needing attention is not determined.

While the example of FIG. 5 focuses on image data, models can be trained to use other types of sensor data, and even business outcome metrics, in addition or as an alternative. For example, audio data from a microphone may be collected and used to train machine learning models as well, so that the models can receive and process audio data to detect unusual or undesirable conditions. This may help to automatically determine, for example, when music is played too loudly or too softly, when speech or environmental noise is too high, and so on. The audio data, with timestamps indicating the portions that correspond to different captured images, can also be used by the models to corroborate or verify that certain events or conditions have occurred. For example, a brief and loud sound at the time a spill occurs can help the model determine with greater confidence that the image data represents a spill.

In step 518, the computer system generates thresholds, rules, and post-processing parameters. These can include rules used to specify actions to take in response to identifying specific conditions and thresholds for the confidence level for a certain condition before action is requested. For example, the condition of litter on a table may have a corresponding threshold of 80% set, so that if the confidence reaches or exceeds this level one or more users are informed of the condition. Similarly, a rule for the litter detected condition can be set to specify which action or actions for the system to take (e.g., generate a task), which users receive notifications, a time period in which the condition should be corrected (e.g., 20 minutes) before further actions are needed, etc. The rules, threshold, and post-processing parameters can be set based on user input, such as instructions provided to the system when the system is set up at a location. In addition, the system may adjust the thresholds and other parameters over time based on the situations observed. For example, if the system uses a threshold of 60% confidence for detecting a condition and users repeatedly dismiss the condition suggesting false positives are occurring in the detection, the system may increase the confidence level requirement (e.g., to a threshold of 70%) to improve the accuracy of results. In some implementations, the thresholds, rules, and post-processing parameters are determined based on image data or other data for the location or view where the model will be used.

In step 520, one or more trained machine learning models are deployed, e.g., provided, installed, or made active. In some implementations, the trained models are delivered to one or more devices (e.g., a mobile device, server system, on-site computer system, etc.) over a communication network. The one or more devices then use the model to process image data from a corresponding camera to monitor an area and detect conditions that need attention or correction.

In some implementations, images, classifications, and user feedback are received (step 522). This optional step can include storing images from a camera used for monitoring, outputs of machine learning models or of a monitoring system generally, and user feedback, such as user interactions in response to notices from the monitoring system. This information can be used to update and refine the one or more machine learning models. For example, with more image data examples, a model's can be refined to provide better accuracy of predictions for the monitored area the model is used to assess. Similarly, user feedback, such as inputs to an application providing the notifications or tasks and actions the users take in response to notifications, can also be used to identify potential inaccuracies, allowing the training of the model to be updated and/or enabling adjustment of the thresholds, rules, and post-processing parameters that are used to select actions based on machine learning model outputs.

The one or more machine learning models can be trained to promote conditions that are associated with business performance or other measures of desirable outcomes for a location. For example, models can be learn which conditions or properties of a monitored area are correlated to increased revenue. Models can be trained to detect conditions that result in increased or decreased revenue. As an example, training data can include captured images or other collected data, with the images associated with properties or outcomes that are not visible from the images, such as customer satisfaction, average purchase amount per customer, total revenue, rate or volume of purchase of a product, frequency of repeat customers (e.g., customers returning at later times), and so on. This can tie the state of a store or other monitored area to the measures of desired outcomes. To do this, data sets for these outcomes can be collected, for example, data indicating customer satisfaction survey results, customer checkout totals over time (e.g., throughout the day), timing of sales of different products over time, and so on. By matching the timestamps of monitoring data with the timestamps for outcomes, the system can obtain examples that can show the impact of conditions of the monitored area on the outcomes. For example, each captured image of the area can be associated with the revenue of the restaurant over the next hour. Outcome metrics for different time periods can be used, and even a time series of outcome metrics (e.g., revenue for each of a series of eight consecutive 15-minute periods following capture of a monitoring image).

The machine learning training can then incorporate into a model relationships between outcomes of interest and the state of the area shown in monitoring images, whether or not the images are labeled with specific conditions shown in the area. For example, with the data sets indicating monitoring data and outcomes, the system can automatically train a model to determine what the ideal or optimal state is to achieve certain outcomes. Similarly, the system can identify states or conditions of the monitored area that decrease desired outcomes and should be avoided. The system can be configured to train a model to optimize for any of various metrics, such as costs, revenue, employee labor percentage (e.g., cost of labor as a percentage of revenue), and so on. The system can use an optimization function (e.g., a cost function or objective function) to train the model to recognize how the state of the monitored area affects certain criteria or factors of interest. This can allow the system to learn which states or conditions of the monitored area results in the best outcomes, e.g., the highest customer satisfaction, highest revenue, lowest cost of labor to revenue, etc.

In some implementations, clustering techniques, such as k-means clustering, can be used to group together instances of monitoring data that are related. For example, monitoring data having similar visual properties or patterns can be grouped together. For example, one location may have a camera pointed outside to a sidewalk where people walk along a street outside a store. The system can use the images to cluster different images to represent different conditions (e.g., high traffic, low traffic, etc.), or to cluster instances of individuals having certain similarities (e.g., men, women, people wearing a suit, etc.). With automated clustering, the system can effectively learn the classifications or types of conditions that are often present in an area, without the set of conditions or classifications being specified in advance. This can also be used to expand the set of classifications or conditions used, even when conditions have been specified in advance. These techniques can be very effective to deal with new conditions and visual patterns that have not occurred in training data and so represent new situations for the models.

As discussed above, the different images can be associated with outcome measures. The system can aggregate the outcome measures and determine how the conditions represented by different clusters of monitoring images affect different outcomes. Each cluster can represent a type of condition identified by the system. The system can then identify the clusters that provide the good outcomes, as well as clusters that provide poor outcomes. With this analysis, the system can inform one or more users of the clusters (with example images showing what the clusters represent) and their effects on outcome metrics when the conditions that those clusters represent occur. In addition, or as an alternative, the clustering and analysis can be used to provide notifications and tasks during ongoing monitoring. For example, when a condition or state of the monitored area that has been linked to poor or reduced outcome metrics is detected, even if the condition does not have a predefined label, the system can create a notification and/or task to address the condition.

For example, the system may analyze images of a display case in a donut shop taken at different times and having different levels of inventory. The sales data for different items from the display case can be tracked and associated with the images. Through the machine learning clustering and analysis, the system may determine that, for example, Boston cream doughnuts sell the most frequently in conditions where monitoring images show they are stocked at about 30% of capacity. Although the images need not be labeled with stock levels, the system can cluster images that show only partial stock displayed for the product, and determine that this cluster provides the highest sales rate of the product. As a result, without knowing the specific percentages of product stocked or any other human labelling of the images, the system can use machine learning to identify the state that leads to higher sales of a specific product (e.g., partial stocking of the product in this example). The system can then indicate this state to a user, for example, providing images of the state determined to promote the highest sales rate and recommending that the state of the display case be made to appear in that state.

In addition, or as an alternative, the system can used the clustered information to detect when conditions of the display case do not match those of the cluster that provides the desired outcomes. For example, if the display case is fully stocked, the system can recognize based on a monitoring image showing the full display area, that the condition is different from the partially stocked condition that is desirable. In other words, the system can determine that the current monitoring image does not fit in the cluster that provides the desired outcome (e.g., the cluster of partial stock for the product). The system can then provide an notification or task for the display case to be adjusted, potentially showing an image representative of the cluster. Thus, if the Boston cream doughnut area is fully stocked, the system may provide a task that the display area should be adjusted to the state indicated in an example image from the cluster, with the image showing only partial stocking of that type of doughnut as the desired, target state to be achieved. A worker can then remove some of the doughnuts from display, to reach the partially-stocked state that the system determined is likely to increase the rate of sale of the product.

Note that the clusters can be labeled if desired and specific directions or instructions for improving the state can be given, but the system can detect and recommend changes even when no labels or corrections are explicitly given. As a result, the system can detect new conditions that need attention, even if that type of condition has not been identified or labeled by a human user, and the system can provide an indication of the desirable state (e.g., showing one or more images from the cluster) to which the monitored area should be adjusted.

The system can evaluate outcome measures associated with images can help the system determine which inconsistencies or differences from baseline characteristics need attention from a worker. The system can also use the outcome metrics to determine the urgency or priority with which conditions should be addressed. For example, some changes from the typical or usual state may be benign, such as adding new furniture. This change may be visually quite different from the typical prior images and would appear to be an inconsistency from the area's desirable baseline state. However, the outcome measures associated with this state may show that metrics such as revenue, customer satisfaction, and so on are stable or even improved with this change, allowing the system to determine that the change does not need correction, or at least does not need urgent attention. On the other hand, other changes detected may occur in small regions of the monitored area but may affect concurrent or subsequent outcome metrics negatively, which the system can interpret as a need for correction or intervention by a user, as well as representing a need to be addressed with higher priority.

Figure 6:
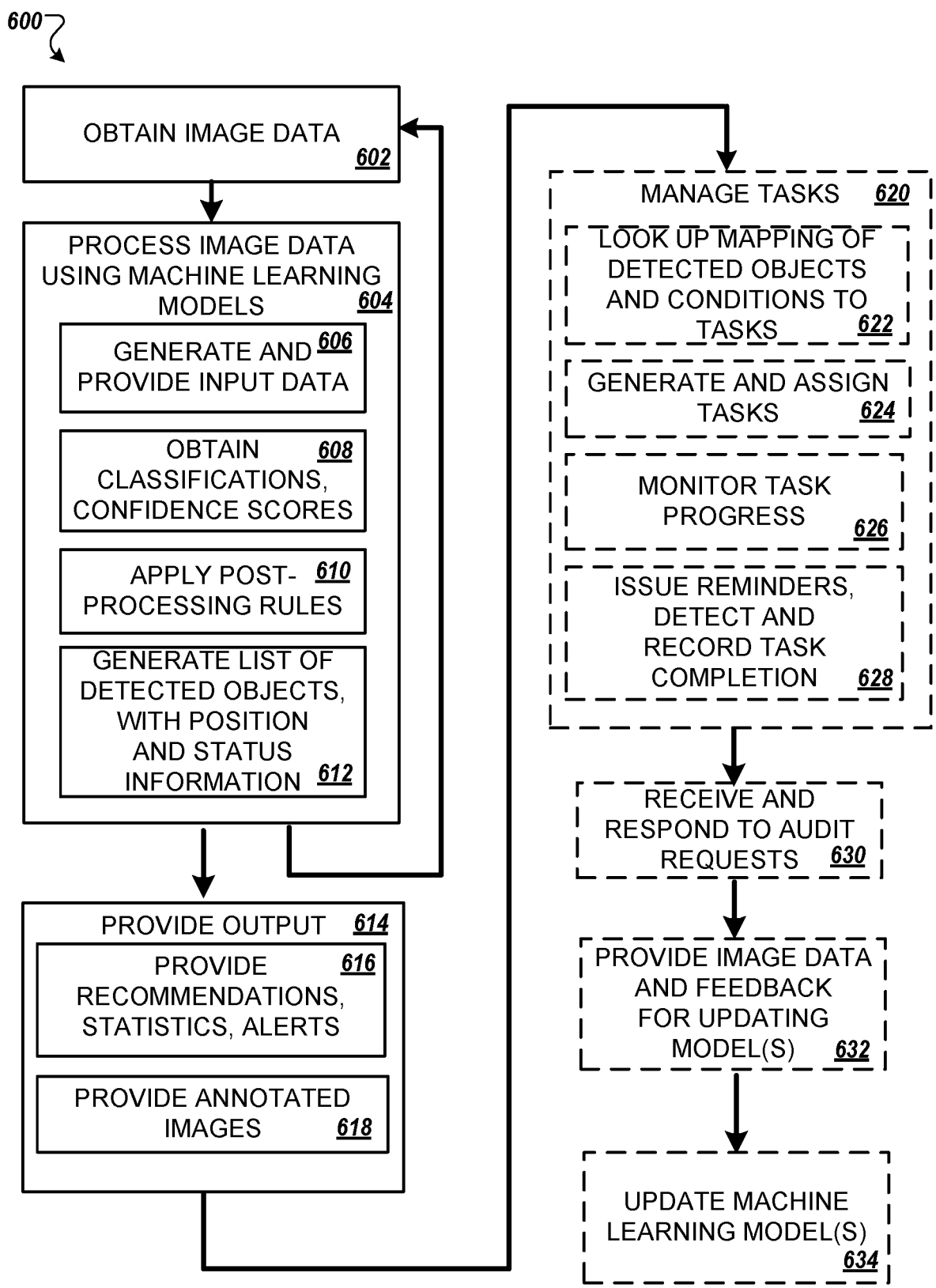
FIG. 6 is a flow diagram showing an example of a process of using machine learning models.

FIG. 6 is a flow diagram showing an example of a process 600 of using machine learning models. FIG. 6 shows an example of various actions that can be performed to, for example, monitor the state of a monitored area by using machine learning models to process image data showing the area. The process 600 can also provide output indicating, e.g., notifications, alerts, tasks, and other data to inform users of detected conditions determined to need attention or correction. Optionally, the process 600 can include features to manage tasks, respond to audit requests, provide feedback, and/or update machine learning models. The process 600 can include features as described above with respect to FIGS. 1A-4.

The process 600 may be performed by one or more computers, such as by the computer system 120. In some implementations, the process 600 is performed by a local computer, e.g., a computer system on premises or nearby. In other implementations, the process 600 is performed by a remote computer system, such as cloud computing system or other remote server, such as the remote computer system 130. In some implementations, some or all of the operations of the process 600 may be divided among or shared between a local computer system 120 and a remote computer system 130.

In step 602, one or more computers receive image data from a camera. The image data can indicate a view of a monitored area at the time the image is captured. In some implementations, the camera is in a fixed location with a fixed view, so that different images having the same view can be periodically determined and processed.

In step 604, the image data is processed using one or more machine learning models. The machine learning models can be structured or trained as discussed above. Examples of machine learning models include neural networks, classifiers, support vector machines, regression models, reinforcement learning models, clustering models, generative adversarial networks, decision trees, random forest models, genetic algorithms, Bayesian models, and Gaussian mixture models. Different types of models can be used together as an ensemble or for making different types of predictions.

Processing the image data can be performed using one or more optional sub-steps 606, 608, 610, 612. For example, a set of input data for the one or more machine learning models can be generated. This process can include pre-processing to an image from a camera, for example, scaling, resizing, or filtering the image. In some implementations, image data (e.g., pixel data) can be provided directly to a model. In some implementations, features representing image elements can be determined and provided as input data. Contextual information, such as a location, time of day, etc. can optionally be provided as input, if the models have been trained to receive and process that type of data. In step 608, output of the machine learning models, provided in response to the set of input data, is received. The output can include indications of detected objects or conditions, including in some implementations an indication (e.g., bounding box or other region) of the location of the detected object or condition within an the image that was processed. The output can indicate classifications made or scores for different classifications. For example, the output can include a classification of a table has having litter present and/or a score indicating a likelihood that the classification is correct, such as a confidence score for the classification decision.

In step 610, the one or more computers apply post-processing rules to interpret the outputs from the machine learning models. This can include filtering detected conditions to those that require actions, and/or mapping detected conditions and their locations in the monitored area to actions or tasks to be performed, as discussed with respect to FIG. 2.

In step 612, the one or more computers generates and provides data indicating a set of detected conditions. In some implementations, this can include a list of detected objects, with position and status information. In other implementations, the generated data can be an indication whether the monitored area is in an acceptable state (e.g., or whether attention or action is needed). For example, the output can indicate whether the image data represents a change from a range of baseline or acceptable conditions for the monitored area. Depending on the conditions detected (e.g., whether any are determined by the system to cause a need for intervention by a user), the one or more computers may proceed to provide output about the conditions detected or not. Regardless, the one or more computers can continue capturing and processing new image data at subsequent times, for example, at an interval of 10 seconds, 1 minute, 5 minutes, or another interval as appropriate for the monitored area.

In step 614, the one or more computers provide output indicating the conditions detected in the monitored area. The output can be provided for presentation by one or more devices, for example, over a local area network, a wide area network such as the Internet, etc. The output can be provided to an application residing at a mobile device (e.g., cellular phone) of a user, to update a user interface view provided by the application or to cause the application to provide a notification. The output can be provided in any of various forms, such as in a notification through an application or operating system of a mobile device, a short message service (SMS) text message, an e-mail message, an item in a data feed of an application, an item in a status page or task list, a web page or web application, etc.

The output can optionally include any of various items of data describing detected conditions, their locations in the monitored area, related statistics and measures, alerts, tasks, and more (step 616). While any detected condition may be provided for a user's review, the system can be configured to limit notifications to those that meet certain criteria, such as needing action or review by a user. In addition or as alternative, the system can distinguish indications of conditions that need attention (e.g., with red color or with a symbol indicating that action is needed) from indications of conditions that do not need to be changed or addressed by a user.

As an example, for a condition that the system determines to be of a type that requires user attention or intervention (e.g., a spill on the floor), once the system detects the condition the system can automatically send data that causes a mobile device to initiate a notification of the condition and/or an associated task or action needed to address the condition. On the other hand, detected conditions that are typical and need no intervention, such as a vacant table or occupied table, would not trigger an notification to the user. Nevertheless, the status of even typical conditions can be reflected on a location's status user interface showing the current status of the monitored area, which may be available if the user chooses to view the interface. The post-processing rules discussed in step 610 or mapping data 191 as discussed with respect to FIG. 2 can be used to determine which types of detected conditions trigger notifications to users and the creation of tasks or action recommendations to address the conditions.

In step 618, the one or more computers can provide an annotated image of the monitored area showing detected condition(s), especially conditions that the system determined to need the attention or intervention of a worker or to be outside the range of normal or expected data patterns for the monitored area. For example, in addition to or as part of a notification about a detected condition, the system can provide an image (or link to an image) of the monitored area having with annotations of detected conditions shown. The image can be the current image captured by the monitoring camera and processed by the models, or may be another representation (e.g., a line drawing or simplified view, or a zoomed-in or cropped region emphasizing the condition(s) that need attention).

In step 620, the one or more computers optionally manage tasks to maintain or improve the state of the monitored area. For example, tasks can be created to address detected conditions, tasks assigned to users, users can be notified and reminded of the tasks, and completion of the tasks can be detected and verified (e.g., by detecting, from processing of subsequently captured images, that the condition prompting creation of the task is no longer present). For example, the one or more computers can look up a mapping of detected objects and conditions to tasks (step 622). Mapping data 191 can indicate which actions the one or more computers should perform and/or the tasks that workers should be perform for each of different types of detected conditions. The one or more computers can generate and assign tasks for workers to complete (step 624). These tasks can identify, for example, the action to perform, the location where the action is needed, and so on. The one or more computers can monitor the progress of the tasks that are created (step 626). For example, the one or more computers can detect that the condition that prompted a task is still present through later-captured images, and can issue reminders or alerts periodically. The one or more computers can also log and indicate to users the amount of time that the condition has persisted, a level of urgency or importance of the task (which may increase the longer the condition is unresolved), and other information. The one or more computers can issue reminders and then detect and record task completion (step 628). The conditions detected using image data and machine learning model processing can be used to corroborate whether tasks that a user indicates have been completed have actually been completed.

The data that the one or more computers store about the conditions detected, the tasks assigned, the user responses to the tasks, and detection of conditions being resolved enables the one or more computers to optionally receive and respond to audit requests (step 630). The audit requests may request information about the conditions of the premises monitored, the responses of the workers at the monitored area, statistics about the frequency of different conditions and responses to them (e.g., average, minimum, or maximum times to address different types of conditions), etc.

In some implementations, the one or more computers provide image data captured by the cameras, as well as user feedback data and outputs based on processing of the machine learning models, to another system or process (step 632). For example, the computer system 120 can provide captured images and data describing related notifications and user actions to the remote computer system 130. The one or more machine learning models can then be updated based on the captured images of the monitored area, to improve the accuracy of the models in detecting conditions in the monitored area (step 634).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    obtaining, by the one or more computers, image data from a camera, the image data representing an image of a monitored area;
    providing, by the one or more computers and to one or more machine learning models, input data that is based on the image data representing the image of the monitored area, wherein the one or more machine learning models have been trained to detect different properties or conditions of the monitored area;
    receiving, by the one or more computers, output of the one or more machine learning models, the output indicating (i) one or more status classifications for the monitored area and a respective location for each of the one or more status classifications, or (ii) whether the image data shows a state that is inconsistent with normal or expected states of the monitored area;
    evaluating, by the one or more computers, the output of the one or more machine learning models to detect a condition present in the monitored area; and
    providing, by the one or more computers, output indicating the detected condition present in the monitored area.

2. The method of claim 1, wherein the one or more machine learning models have been trained to detect a plurality of different types of objects and to indicate a status of at least one of the types of objects; and
    wherein the output of the one or more machine learning models indicates (i) locations of identified objects in the image data representing the image of the monitored area, (ii) an object status classification for at least one of the identified objects, and (iii) confidence scores for the identification of the identified objects and/or the object status classifications.

3. The method of claim 2, wherein evaluating the output of the one or more machine learning models comprises:
    applying one or more post-processing rules to the output of the one or more machine learning models to filter a list of the identified objects based on the confidence scores; and
    evaluating the filtered list of identified objects with respect to one or more predetermined criteria to detect a condition present in the monitored area.

4. The method of claim 1, wherein evaluating the output of the one or more machine learning models comprises:
    detecting, output of the one or more machine learning models, a condition representing a difference from a desirable range or set of conditions for the monitored area.

5. The method of claim 1, comprising storing data indicating a baseline range or set of conditions for the monitored area;
    wherein evaluating the output of the one or more machine learning models comprises determining, based on the output of the one or more machine learning models, that the image data represents a state of the monitored area that is outside a baseline range or set of conditions for the monitored area; and
    wherein providing the output indicating the detected condition present in the monitored area is performed in response to determining that the image data represents a state of the monitored area that is outside the baseline range or set of conditions for the monitored area.

6. The method of claim 1, comprising determining that the detected condition is a condition for which intervention by a user is needed; and
    wherein providing the output indicating the detected condition present in the monitored area is performed in response to determining that the detected condition is a condition for which intervention by a user is needed.

7. The method of claim 1, wherein the output identifies the location of the detected condition within the monitored area by providing an identifier for an object or location of the detected condition or indicating a region of the image data where the detected condition occurs.

8. The method of claim 1, comprising generating a record for a task corresponding to the detected condition; and
    wherein providing the output comprises providing, to a device associated with a worker for the monitored area, data indicating the task to be performed.

9. The method of claim 8, comprising;
    accessing mapping data that maps conditions at the monitored area with tasks to perform corrective actions to remove the respective conditions;
    wherein generating the record for the task comprises:
        identifying the task that the mapping data associates with the detected condition; and
        creating a new instance of the identified task.

10. The method of claim 8, comprising:
    accessing data indicating a set of workers associated with the monitored area;
    identifying, from among the set of workers, a worker having responsibility for the detected condition; and
    assigning the task to the identified worker;

wherein providing data indicating the task to be performed comprises providing an indication of the assigned task to a device associated with the identified worker.

11. The method of claim 8, comprising, after providing the data indicating the task to be performed:
    obtaining second image data from the camera representing a second image of the monitored area;
    processing the second image data using the one or more machine learning models to detect conditions present in the monitored area, and based on processing the second image data:
        determining that the task has been completed based on determining that detected condition is not detected based on the second image data; or
        determining that the task has not been completed based on determining that the detected condition is detected based on the second image data.

12. The method of claim 1, comprising:
    obtaining audio data recorded by a microphone located in the monitored area; and
    using the audio data to determine an event or condition at the monitored area.

13. The method of claim 12, wherein using the audio data to determine an event or condition at the monitored area comprises:
    determining whether a sound level at the monitored area exceeds a threshold; or
    determining whether one or more workers spoke a predetermined word or phrase in a conversation with a visitor to the monitored area.

14. The method of claim 1, wherein the one or more machine learning models comprise a convolutional neural network.

15. The method of claim 1, wherein the one or more machine learning models comprise a neural network comprising a region proposal network portion configured to identify regions within an image and an object detection network portion configured to classify the regions identified by the region proposal network portion.

16. The method of claim 1, wherein the monitored area is a public area of a retail store.

17. The method of claim 16, wherein the retail store is a restaurant.

18. The method of claim 1, wherein providing output indicating the detected condition present in the monitored area comprises providing image data for an image of the monitored area having an annotation indicating a location of the detected condition within the monitored area.

19. A system comprising:
    one or more computers; and
    one or more computer-readable media storing instructions that, when executed by the one or more computers, cause the one or more computers to perform operations comprising:
        obtaining, by the one or more computers, image data from a camera, the image data representing an image of a monitored area;
        providing, by the one or more computers and to one or more machine learning models, input data that is based on the image data representing the image of the monitored area, wherein the one or more machine learning models have been trained to detect different properties or conditions of the monitored area;
        receiving, by the one or more computers, output of the one or more machine learning models, the output indicating (i) one or more status classifications for the monitored area and a respective location for each of the one or more status classifications, or (ii) whether the image data shows a state that is inconsistent with normal or expected states of the monitored area;
        evaluating, by the one or more computers, the output of the one or more machine learning models to detect a condition present in the monitored area; and
        providing, by the one or more computers, output indicating the detected condition present in the monitored area.

20. One or more non-transitory computer-readable media storing instructions that, when executed by one or more computers, cause the one or more computers to perform operations comprising:
    obtaining, by the one or more computers, image data from a camera, the image data representing an image of a monitored area;
    providing, by the one or more computers and to one or more machine learning models, input data that is based on the image data representing the image of the monitored area, wherein the one or more machine learning models have been trained to detect different properties or conditions of the monitored area;
    receiving, by the one or more computers, output of the one or more machine learning models, the output indicating (i) one or more status classifications for the monitored area and a respective location for each of the one or more status classifications, or (ii) whether the image data shows a state that is inconsistent with normal or expected states of the monitored area;
    evaluating, by the one or more computers, the output of the one or more machine learning models to detect a condition present in the monitored area; and
    providing, by the one or more computers, output indicating the detected condition present in the monitored area.

* * * * *